(12) United States Patent
Sekine et al.

(10) Patent No.: US 8,094,148 B2
(45) Date of Patent: Jan. 10, 2012

(54) TEXTURE PROCESSING APPARATUS, METHOD AND PROGRAM

(75) Inventors: Masahiro Sekine, Yokohama (JP); Yasunobu Yamauchi, Kawasaki (JP); Isao Mihara, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 944 days.

(21) Appl. No.: 12/050,568

(22) Filed: Mar. 18, 2008

(65) Prior Publication Data
US 2008/0238930 A1 Oct. 2, 2008

(30) Foreign Application Priority Data
Mar. 28, 2007 (JP) .................. 2007-085706

(51) Int. Cl.
*G06F 17/00* (2006.01)
*G06T 15/60* (2006.01)
*G09G 5/00* (2006.01)
*G09G 5/02* (2006.01)
*H04N 5/14* (2006.01)
*G06K 9/40* (2006.01)
*G06K 9/32* (2006.01)

(52) U.S. Cl. ........ 345/418; 345/426; 345/582; 345/606; 345/619; 348/25; 348/169; 382/254; 382/285; 382/293; 382/300

(58) Field of Classification Search .......... 345/418–420, 345/426, 428, 581–583, 586–589, 593, 600, 345/606, 657, 618–619, 652–654, 683, 549; 348/25, 169, 174, 502; 382/254, 285, 293–300; 358/509–512; 463/1, 30–33
See application file for complete search history.

(56) References Cited

U.S. PATENT DOCUMENTS

| | | | |
|---|---|---|---|
| 6,281,904 B1 * | 8/2001 | Reinhardt et al. | 345/582 |
| 6,750,873 B1 * | 6/2004 | Bernardini et al. | 345/582 |
| 7,129,954 B2 | 10/2006 | Sekine et al. | 345/582 |
| 2003/0234784 A1 * | 12/2003 | Grzeszczuk et al. | 345/426 |

(Continued)

FOREIGN PATENT DOCUMENTS

JP 2001-325605 11/2001

(Continued)

OTHER PUBLICATIONS

Office Action corresponding to Japanese Patent Application No. 2007-085706 dated Nov. 4, 2008.

(Continued)

*Primary Examiner* — Wesner Sajous
(74) *Attorney, Agent, or Firm* — Ohlandt, Greeley, Ruggiero & Perle, L.L.P.

(57) ABSTRACT

A texture processing apparatus includes a CG data acquisition unit acquiring calculator graphics (CG) data including CG model data, camera data, light data, texture data items, and a preset emphasis parameter for texture mapping processing, the CG model data, the camera data and the light data composing data for rendering a CG image, the texture data items being acquired or produced under different conditions, a calculation unit calculating, using the CG data, an emphasis texture processing condition corresponding to the preset emphasis parameter, the emphasis texture processing condition being used to perform texture mapping processing on a CG model, an extraction unit extracting a particular texture data item from the acquired texture data items in accordance with the texture processing condition, and a processing unit performing emphasis processing on the particular texture data item in accordance with the preset emphasis parameter to obtain a emphasized texture data item.

23 Claims, 16 Drawing Sheets

U.S. PATENT DOCUMENTS

| | | | | |
|---|---|---|---|---|
| 2004/0212725 A1* | 10/2004 | Raskar | ............ | 348/370 |
| 2006/0017741 A1 | 1/2006 | Sekine et al. | ............ | 345/582 |
| 2006/0114262 A1 | 6/2006 | Yamauchi et al. | ............ | 345/582 |
| 2007/0013713 A1 | 1/2007 | Sekine et al. | ............ | 345/582 |
| 2007/0018994 A1 | 1/2007 | Sekine | ............ | 345/582 |
| 2007/0098288 A1* | 5/2007 | Raskar et al. | ............ | 382/254 |
| 2007/0296721 A1* | 12/2007 | Chang et al. | ............ | 345/427 |
| 2008/0232647 A1* | 9/2008 | Yamauchi et al. | ............ | 382/108 |

FOREIGN PATENT DOCUMENTS

| | | |
|---|---|---|
| JP | 2005-86414 | 3/2005 |
| JP | 2006/146326 | 6/2006 |

OTHER PUBLICATIONS

U.S. Appl. No. 11/857,870, filed Sep. 19, 2007, Masahiro Sekine.
U.S. Appl. No. 11/687,745, filed Mar. 19, 2007, Masahiro Sekine.

* cited by examiner

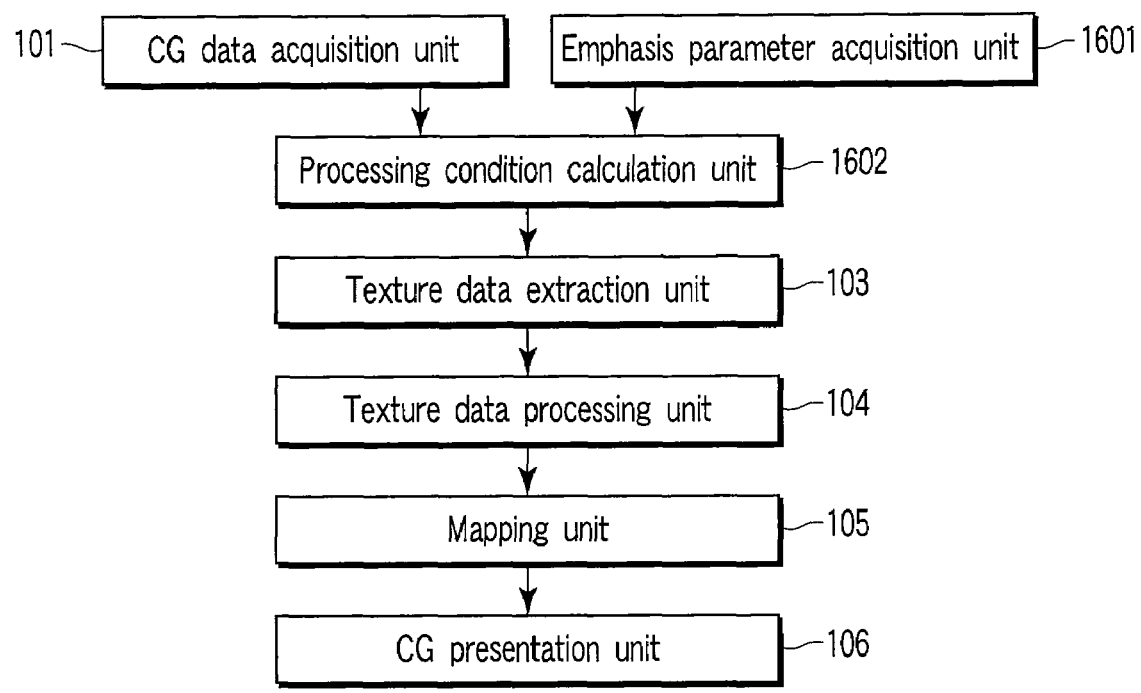
F I G. 16

TEXTURE PROCESSING APPARATUS, METHOD AND PROGRAM

CROSS-REFERENCE TO RELATED APPLICATIONS

This application is based upon and claims the benefit of priority from prior Japanese Patent Application No. 2007-085706, filed Mar. 28, 2007, the entire contents of which are incorporated herein by reference.

BACKGROUND OF THE INVENTION

1. Field of the Invention

The present invention relates to a texture processing apparatus, method and program for high-quality texture mapping techniques in the field of calculator graphics (CG).

2. Description of the Related Art

In recent years, CG techniques have rapidly been progressed, and realistic graphics renderings that have a strong resemblance to photographs have come to be possible. However, many high-quality CG products for movies and TV programs cost extremely high, since they are often produced by long-time hard-working manual efforts. In the future, there will be an increasing demand for various CG renderings, and hence for techniques for easily producing high-quality CG produces at low cost.

A texture mapping technique is a technique for rendering the surface texture of a CG model, and is widely used for CG image production. Specifically, it is used to attach, to the surface of a CG model, images obtained by photography, or images drawn by a content producer, based on texture coordinates prepared for CG data. In rendering the texture of a CG model surface, it is considered especially difficult to render cloth, skin or fur. To render a material of a soft feel, it is very important to express changes in the surface color of a material or changes in the self shadow of the material, which depend upon a direction (i.e., a viewpoint direction) in which the material is viewed and a direction (i.e., a light direction) in which illumination is applied.

In view of the above, a scheme for photographing real materials and reproducing the properties of the materials to generate realistic CG images has come to be actively used.

Concerning rendering of the texture of a surface corresponding to viewpoint and light directions, researches of modeling schemes called, for example, Bidirectional Reference Distribution Function (BRDF), Bi-directional Texture Function (BTF) and Polynomial Texture Maps (PTM) have been advanced. These schemes employ approaches to analyze acquired data to derive a function model. Further, an approach to hold, as texture data, an image obtained by photography, and then to adaptively select and map textures based on parameters, such as the viewpoint direction and light direction, has been proposed by, for example, JP-A 2006-146326 (KOKAI). These approaches enable realistic texture rendering of materials that are hard to model, i.e., materials that involve complex color/luminance changes.

On the other hand, media for providing such CG images as the above have also rapidly been advanced. For instance, three-dimensional or stereoscopic display devices of various schemes capable of displaying three-dimensional moving pictures have recently been developed. In particular, there is an increasing demand for a flat panel type display that does not require, for example, dedicated glasses. A scheme of providing, immediately before a display panel (display device) with pixels fixed in position, such as a direct-view or projection type liquid crystal display device or plasma display device, a ray control element used to direct, to an observer, rays emitted from the display panel is known as a scheme that can be relatively easily realized.

The ray control element is generally called a parallax barrier, and is used to control light so as to enable an observer to see different images at different angles even at the same position on the ray control element. Specifically, when only a horizontal parallax is imparted, a slit or lenticular sheet (cylindrical lens array) is used. When both horizontal and vertical parallaxes are imparted, a pin-hole array or lens array is used. The scheme utilizing a parallax barrier is further classified into a binocular scheme, multi-view scheme, super multi-view scheme (a super multi-view condition for a multi-view scheme), and integral photography (hereinafter referred to as "IP"). The basic principle of these schemes is substantially the same as that employed for stereo photography and invented about 100 years ago.

In both the IP scheme and multi-view scheme, the visual distance is usually limited, and hence a display image is formed as if a perspective projection image at the visual distance was actually seen. In the case of the IP scheme (one-dimensional IP scheme) in which only a horizontal parallax is imparted (i.e., no vertical parallax is imparted), if the horizontal pitch of the parallax barrier is an integer multiple of the horizontal pitch of pixels, there exist a plurality of parallel rays. In this case, a correctly projected stereoscopic image can be obtained by dividing, in units of pixel lines, an image obtained by performing perspective projection of a constant viewing distance in the vertical direction and performing parallel projection in the horizontal direction, and superimposing the resultant image components into a parallax synthesis image as an image format for displaying an image on a display surface (see, for example, JP-A 2005-086414 (KOKAI)). In the multi-view scheme, a correctly projected stereoscopic image can be obtained by distributing images acquired by simple perspective projection.

Further, an imaging apparatus, in which different projection methods or different projection center distances are employed in the vertical direction and horizontal direction, must employ a camera or lens of the same size as that of a subject when, in particular, parallel projection is performed. Therefore, it is hard to realize such an apparatus. This being so, to obtain parallel projection data by photography, the use of a method for converting data obtained by perspective projection is more practical. This method includes, for instance, a known ray spacing method which utilizes interpolation using EPI (epipolar plane).

The above-mentioned techniques are background techniques for enhancing the texture of a material in CG, and for realizing stereoscopic vision on a stereoscopic display. However, there is a case where a texture or stereoscopic effect that satisfies a user may not be obtained simply by mapping texture data corresponding to material images obtained by photography. This is because there are some constraints (specifications) on the color representation power of a medium or the depth representation power of a stereoscopic display. Accordingly, there is a demand for a technique of emphasizing texture data before texture mapping processing, thereby enhancing the texture of a material in CG or the stereoscopic effect of a stereoscopic display.

When a plurality of sheets of texture data acquired under different viewpoint conditions and light conditions are directly mapped onto a CG model, the resultant image may not have quality that satisfies a user, depending upon a medium that presents the image. This is because there are some constraints (specifications) on the color representation power of a medium for presenting CG images, or on the depth representation power of a stereoscopic display.

In the case of processing a single texture data item, the texture of a CG image surface can be emphasized by, for example, subjecting the texture data to image processing to thereby enhance its contrast. However, in the case of processing a plurality of texture data items, any means for emphasizing the texture of a CG image surface has not yet been established for a method of selecting a to-be-mapped data item from the texture data items, or a method of processing the selected texture data item.

BRIEF SUMMARY OF THE INVENTION

In accordance with an aspect of the invention, there is provided a texture processing apparatus comprising: a CG data acquisition unit configured to acquire calculator graphics (CG) data including CG model data, camera data, light data, texture data items, and a preset emphasis parameter for texture mapping processing, the CG model data, the camera data and the light data composing data for rendering a CG image, the texture data items being acquired or produced under different conditions; a calculation unit configured to calculate, using the CG data, an emphasis texture processing condition corresponding to the preset emphasis parameter, the emphasis texture processing condition being used to perform texture mapping processing on a CG model; an extraction unit configured to extract a particular texture data item from the acquired texture data items in accordance with the texture processing condition; and a processing unit configured to perform emphasis processing on the particular texture data item in accordance with the preset emphasis parameter to obtain a emphasized texture data item.

In accordance with another aspect of the invention, there is provided a texture processing apparatus comprising: a CG data acquisition unit configured to acquire calculator graphics (CG) data including CG model data, camera data, light data, and texture data items for texture mapping processing, the CG model data, the camera data and the light data composing data for rendering a CG image, the texture data items being acquired or produced under different conditions; a parameter acquisition unit configured to acquire an emphasis parameter used for texture mapping processing; a calculation unit configured to calculate, using the CG data, an emphasis texture processing condition corresponding to the emphasis parameter, the emphasis texture processing condition being used to perform texture mapping processing on a CG model; an extraction unit configured to extract a particular texture data item from the acquired texture data items in accordance with the texture processing condition; and a processing unit configured to perform emphasis processing on the particular texture data item in accordance with the emphasis parameter to obtain a emphasized texture data item.

BRIEF DESCRIPTION OF THE SEVERAL VIEWS OF THE DRAWING

FIG. 16 is a block diagram illustrating a texture mapping apparatus employed in a third embodiment;

DETAILED DESCRIPTION OF THE INVENTION

Figure 1:
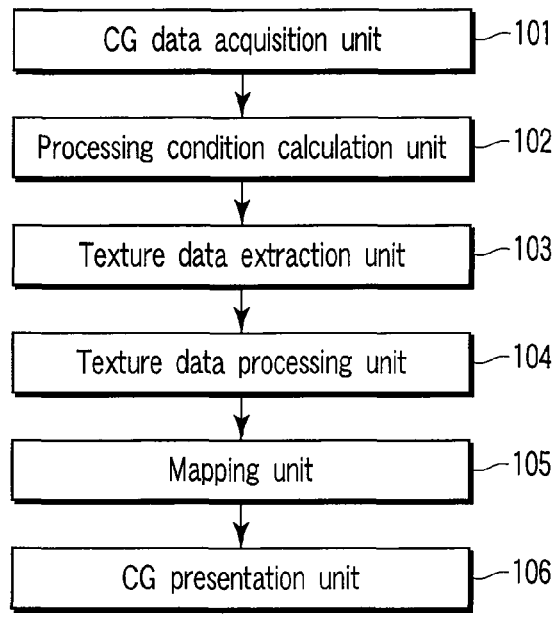
FIG. 1 is a block diagram illustrating a texture mapping apparatus employed in first and second embodiments.

Texture processing apparatuses, methods and programs according to embodiments of the invention will be described in detail with reference to the accompanying drawings. In the embodiments, like reference numbers denote like elements, and duplication of explanation is omitted.

The texture processing apparatuses, methods and programs of the embodiments are techniques for emphasizing changes in textures to be mapped on a CG surface to enhance material feel and/or CG stereoscopic effect.

In the texture processing apparatuses, methods and programs of the embodiments, an appropriate texture is selected from textures acquired or produced under different conditions, and subjected to emphasis processing, thereby enhancing material feel and/or CG stereoscopic effect.

In the embodiments, when texture data to be mapped is selected from a plurality of texture data items obtained or produced under different conditions, selection conditions are calculated by emphasizing a change in the position of a camera or light, or a change in the shape of a CG model. Further, texture data to be mapped on a CG model is produced by emphasizing a change in the color of the selected texture data. As a result, material feel or CG stereoscopic effect can be enhanced.

The texture mapping apparatuses of the embodiments acquire CG model data necessary for CG rendering, camera data, light data, and a plurality of texture data items obtained under various conditions, such as a viewpoint condition and light condition. Using preset or externally acquired emphasis parameters, processing conditions for texture data are determined. Subsequently, texture data corresponding to the determined processing conditions is extracted, and is subjected to emphasis processing using preset parameters or externally acquired parameters. The thus-emphasized texture data is mapped onto a CG model, thereby enhancing material feel and CG stereoscopic effect.

In a first embodiment, a description will be given of a series of processing performed by a texture mapping apparatus and texture generation apparatus (which will hereinafter collectively be referred to as a "texture processing apparatus"). Further, in the first embodiment, various emphasis methods employed when a CG image is rendered using one camera (i.e., using a single viewpoint) will be described.

In a second embodiment, an emphasis method employed when a CG image is rendered using a plurality of cameras (i.e., using a plurality of viewpoints) will be described. When performing rendering using a plurality of viewpoints, an emphasis method different from that for rendering performed using a single viewpoint may be employed. In the second embodiment, a description will be given of a texture mapping emphasis method for rendering performed using a plurality of viewpoints, and its effect.

In a third embodiment, a description will be given of a texture mapping apparatus capable of receiving external emphasis parameters. A specific example of a method of changing emphasis parameters in accordance with, for example, the characteristics of CG data or the specification of a medium that presents CG data, and a method of manually changing setting concerning the parameters will be described.

FIRST EMBODIMENT

Referring first to FIG. 1, a texture mapping apparatus according to a first embodiment will be described. FIG. 1 is a view illustrating the configuration of the texture mapping apparatus.

As shown, the texture mapping apparatus of the first embodiment comprises a CG data acquisition unit 101, processing condition calculation unit 102, texture data extraction unit 103, texture data processing unit 104, mapping unit 105, and CG presentation unit 106. This apparatus receives CG model data necessary for rendering a CG image, camera data, light data, and a plurality of sheets of texture data acquired under various conditions, such as a viewpoint condition and light condition, and executes emphasis texture mapping processing, based on preset emphasis parameters.

The CG data acquisition unit 101 acquires CG model data necessary for rendering a CG image, camera data, light data, and a plurality of sheets of texture data (hereinafter collectively be referred to as "CG data") acquired or produced under different conditions. Different conditions include, for example, viewpoint/light position conditions used for photographing textures. Assume that in the first embodiment, texture data is input, which is acquired by photography under viewpoint and light conditions represented by $\theta_C$, $\phi_C$, $\theta_I$ and $\phi_I$, as employed in a method described later with reference to FIG. 5. The texture mapping apparatus can be set such that it is also operable in accordance with various signals that change depending upon various nature conditions, such as time, velocity, acceleration, pressure, temperature and humidity, as well as the viewpoint/light conditions.

The processing condition calculation unit 102 uses CG data acquired by the CG data acquisition unit 101, to thereby calculate, based on preset emphasis parameters, emphasis texture processing conditions for texture generation. Specifically, the processing condition calculation unit 102 calculates processing conditions to select, from a plurality of sheets of texture data obtained by photography, texture data to be mapped onto a CG model or to be produced. In the prior art, viewpoint and light conditions represented by $\theta_C$, $\phi_C$, $\theta_I$ and $\phi_I$ are calculated for every point on a CG model surface. In contrast, in the embodiment, calculation methods for various processing conditions are determined in accordance with preset emphasis parameters. The preset emphasis parameters include, for example, an angle-condition emphasis rate, camera-position emphasis rate (for a single viewpoint), light emphasis rate (for a single viewpoint), and model-shape emphasis rate (for a single viewpoint). Using these emphasis rates, processing conditions, such as an angle condition, camera position condition, light condition and model shape condition, can be emphasized. The respective emphasis methods and effects will be described later.

The texture data extraction unit 103 extracts particular texture data from the texture data acquired by the CG data acquisition unit 101, in accordance with the texture processing conditions calculated by the processing condition calculation unit 102. For instance, appropriate texture data is extracted from a plurality of sheets of texture data obtained under the calculated viewpoint condition and light condition. If there is no texture data that matches the processing conditions, or if color data emphasis is performed at the next texture data processing step, it is necessary to extract texture data that satisfies a neighboring condition.

The texture data processing unit 104 executes, using preset emphasis parameters, emphasis processing on the texture data extracted by the texture data extraction unit 103. In the prior art, it is necessary to interpolate the extracted texture data satisfying the neighboring condition, only when there is no texture data that matches the processing conditions. In contrast, in the apparatus of the embodiment, processing for emphasizing texture data is performed based on preset emphasis parameters. For instance, emphasis of color change is performed using a color change emphasis rate (for a single viewpoint) set as an emphasis parameter. Emphasis of color change (for a single viewpoint) will be described later with reference to FIG. 11.

The mapping unit 105 maps emphasized texture data onto the CG model data acquired by the CG data acquisition unit 101, thereby generating a CG image. The CG presentation unit 106 presents the CG image produced by the mapping unit 105.

Figure 2:
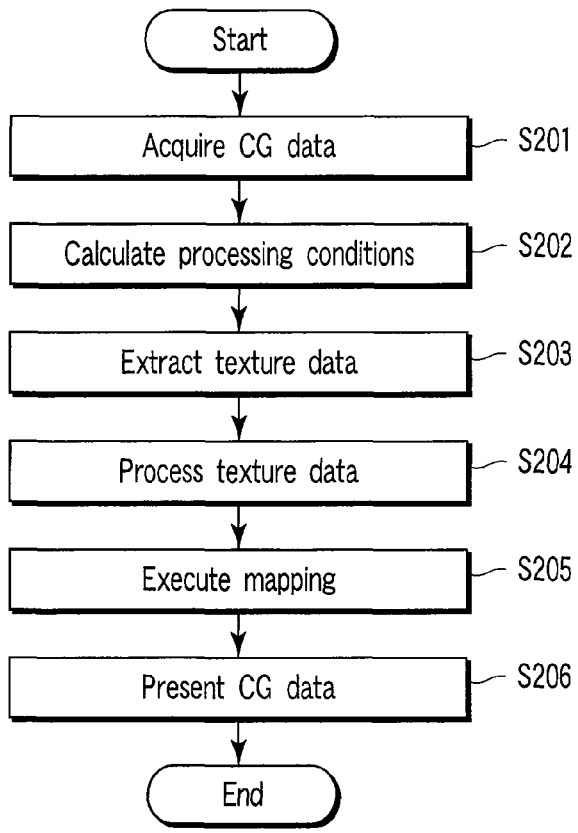
FIG. 2 is a flowchart illustrating an operation example of the texture mapping apparatus of FIG. 1.

Referring then to FIG. 2, a description will be given of an operation example of the texture mapping apparatus of FIG. 1. FIG. 2 shows a series of processing performed by the texture mapping apparatus of FIG. 1.

Firstly, the CG data acquisition unit 101 acquires CG data (step S201). Subsequently, the processing condition calculation unit 102 uses the CG data acquired at step S201 to calculate, based on preset emphasis parameters, emphasis texture conditions for texture generation (step S202). The texture data extraction unit 103 extracts particular texture data from the texture data acquired at step S201, based on the texture processing conditions (step S203). The texture data processing unit 104 executes emphasis processing on the texture data extracted at step S203, using preset emphasis parameters (step S204). The mapping unit 105 maps the emphasized texture data onto CG model data acquired at step S201, thereby generating a CG image (step S205). The CG presentation unit 106 presents the CG image produced at step S205 (step S206).

Figure 3:
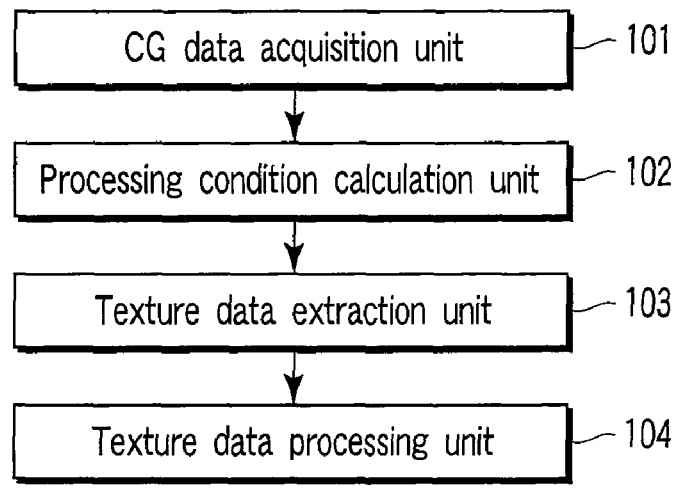
FIG. 3 is a block diagram illustrating a texture generation apparatus employed in the first and second embodiments.
Figure 4:
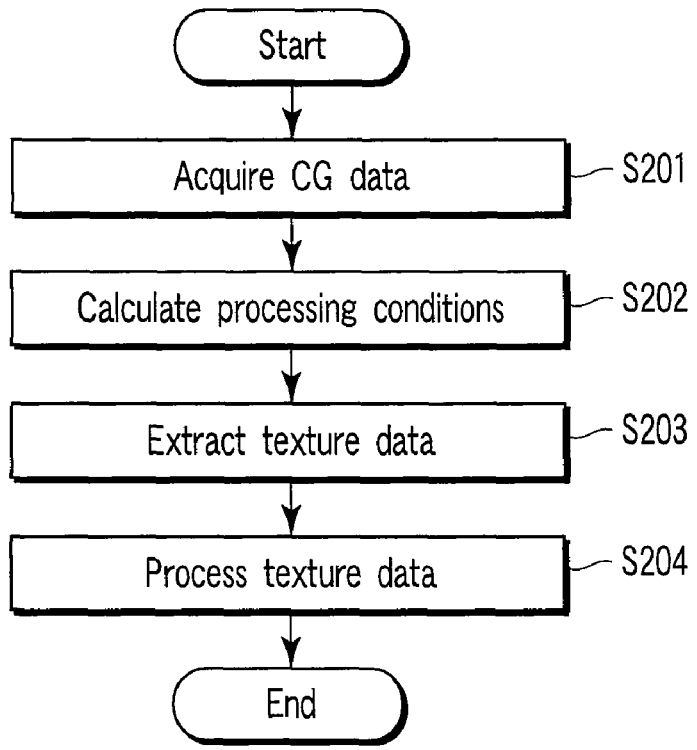
FIG. 4 is a flowchart illustrating an operation example of the texture generation apparatus of FIG. 3.

Referring to FIGS. 3 and 4, the texture generation apparatus of the embodiment will be described.

As shown in FIG. 3, the texture generation apparatus of the embodiment is obtained by removing the mapping unit 105 and CG presentation unit 106 from the texture mapping apparatus of FIG. 1. The texture generation apparatus of the embodiment performs, for example, the operation as shown in FIG. 4, i.e., the operation of FIG. 2 except for steps S205 and S206.

The texture mapping apparatus of FIG. 1 and the texture generation apparatus of FIG. 3 are mainly characterized in that the processing condition calculation unit 102 and texture data processing unit 104 determine the methods of selecting and processing texture data, based on preset emphasis parameters.

Figure 5:
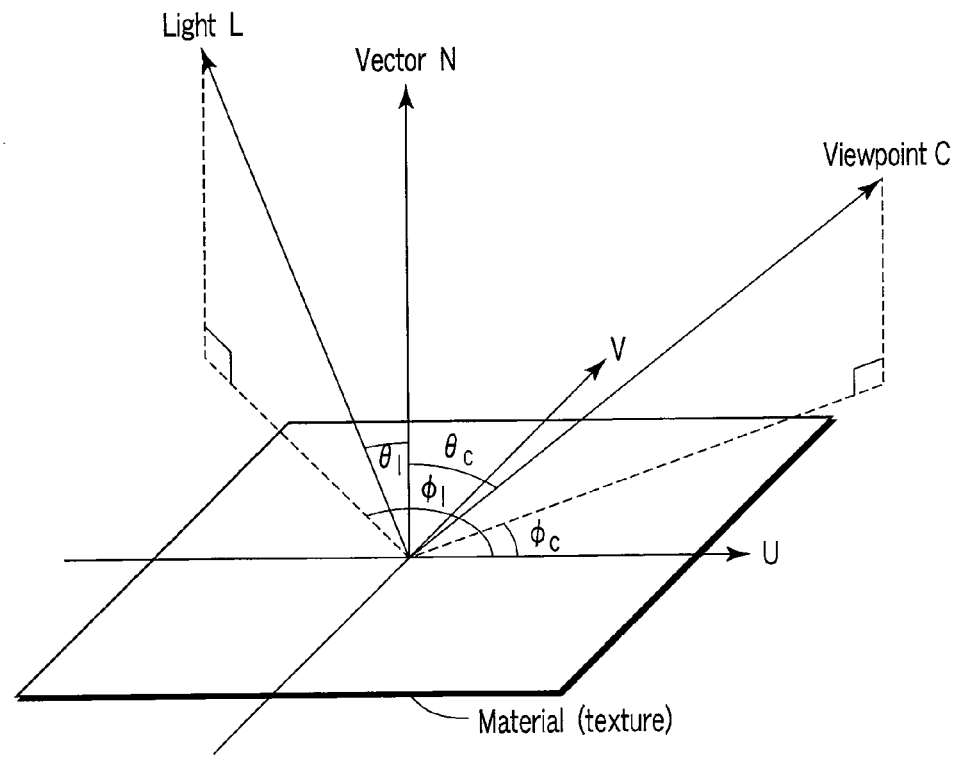
FIG. 5 is a view useful in explaining a method of acquiring fixtures under different viewpoint/light conditions.

Referring then to FIG. 5, a brief description will be given of a conventional texture mapping processing example in which texture data obtained under different viewpoint and/or light conditions are input, and appropriate texture data is selected therefrom, based on viewpoint and light conditions concerning a CG model, and is mapped.

Firstly, a material is photographed under various photography conditions, i.e., while a camera (viewpoint) or a light are inclined or rotated. Specifically, the material is positioned in a space as shown in FIG. 5, and is photographed with the positions $\theta_C$, $\phi_C$, $\theta_I$ and $\phi_I$ of the viewpoint and light regularly changed, with the result that data items indicating a plurality of textures photographed under different conditions are obtained. The thus-obtained texture data items and their photography conditions are associated with each other and stored as a database.

Subsequently, concerning every point on the surface of a CG model, a viewpoint condition and light condition are calculated. The viewpoint condition and light condition are expressed in terms of angles, i.e., $\theta_C$, $\phi_C$, $\theta_I$ and $\phi_I$, as in the case of photography. After that, texture data suitable to the calculated viewpoint condition and light condition is extracted from the database. If there is no texture data that matches the conditions, texture data that satisfies a neighboring condition is extracted and subjected to interpolation, thereby generating texture data to be mapped. Lastly, pixel data (color data) corresponding to the texture coordinates designated by the extracted texture data is mapped onto a target point of the CG model, whereby a CG image portion of relatively high quality texture is acquired.

In the first embodiment, it will be described how the proposed texture mapping apparatus or generation apparatus can realize mapping or generation of texture emphasized compared to the prior art. Further, the first embodiment is directed to a case where CG rendering is executed using a single camera (a single viewpoint).

A description will firstly be given of examples of emphasis texture processing conditions calculated by the processing condition calculation unit 102, i.e., (1) an emphasis angle condition, (2) an emphasis camera-position condition (for a single viewpoint), (3) an emphasis light condition (for a single viewpoint), and (4) an emphasis model shape condition (for a single viewpoint).

(1) Emphasis Angle Condition

In an emphasis angle condition, the viewpoint condition and light condition ($\theta_C$, $\phi_C$, $\theta_I$ and $\phi_I$) calculated by the conventional method are subjected to emphasis processing using an angle-condition emphasis rate. For instance, if the angle-condition emphasis rate is 1.5 and the original viewpoint condition and light condition ($\theta_C$, $\phi_C$, $\theta_I$ and $\phi_I$) are (20, 10, 30, 15), the emphasis results are ($\theta_C$, $\phi_C$, $\theta_I$ and $\phi_I$)=(30, 15, 45, 22.5). Thus, the angle condition is emphasized. Namely, this processing enables even a small change in the shape of a model to be emphasized. However, since a certain range is set for the angle condition, if the emphasis result falls outside the range, it is necessary to round the result.

(2) Emphasis Camera-position Condition (for a Single Viewpoint)

Figure 6:
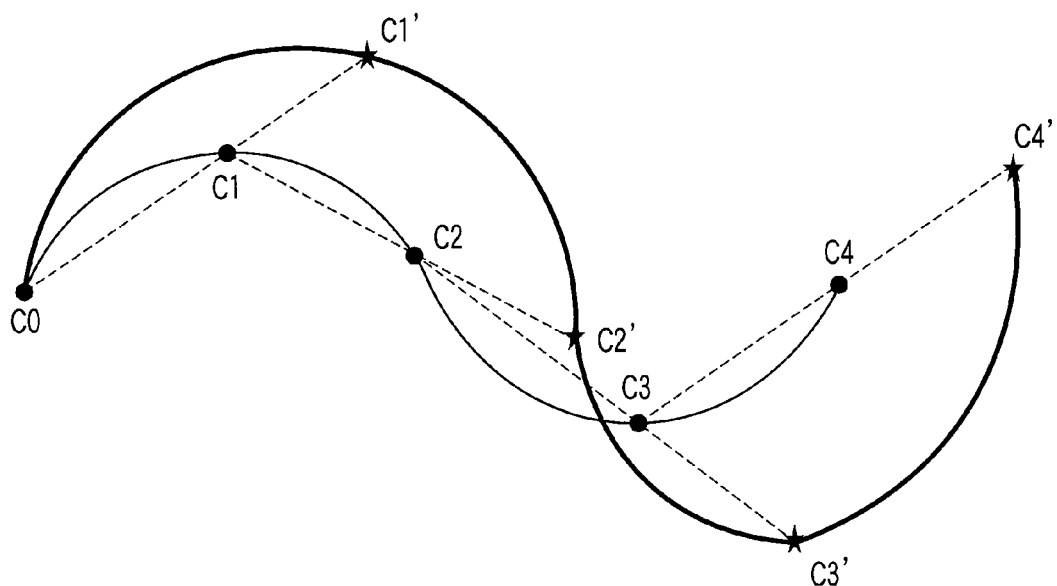
FIG. 6 is a view illustrating a method of emphasizing changes in the position of a camera as a single viewpoint.

In an emphasis camera-position condition, virtual camera data is produced, using a camera-position change emphasis rate, for CG data obtained when the position of a camera is shifting in units of frames (i.e., when camera work exists), thereby emphasizing changes in camera position. FIG. 6 shows a method of emphasizing changes in camera position. For example, when CG data obtained by a camera having its position shifted from C0 to C4 exists, the vector that indicates a change from C0 to C1 in the position of the camera is calculated, and is multiplied by a camera-position change emphasis rate. Using the thus-obtained vector, a virtual camera position C1' shifted from C0 is calculated. Using the same method, C2', C3' and C4' are obtained, thereby generating emphasized camera work. By calculating four viewpoint conditions using the virtual camera positions, changes in texture due to shift of the camera can be emphasized.

(3) Emphasis Light Condition (for a Single Viewpoint)

Figure 7:
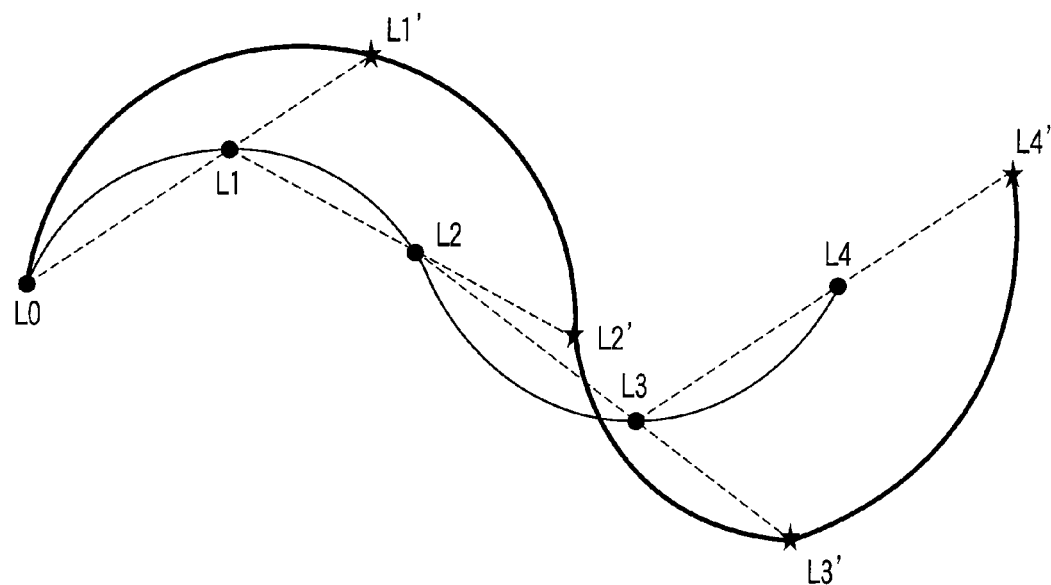
FIG. 7 is a view illustrating a method of emphasizing changes in the position of a light, employed when a single viewpoint is employed.

In an emphasis camera-position condition, virtual light data is produced, using a light-position change emphasis rate, for CG data obtained when the position of a light is shifting in units of frames, thereby emphasizing changes change in light position. FIG. 7 shows a method of emphasizing changes in light position. For example, when CG data obtained by a light having its position shifted from L0 to L4 exists, the vector that indicates a change from L0 to L1 in the position of the light is calculated, and is multiplied by a light-position change emphasis rate. Using the thus-obtained vector, a virtual light position L1' shifted from L0 is calculated. Using the same method, L2', L3' and L4' are obtained, thereby generating emphasized light movement. By calculating four light conditions using the virtual light positions, changes in texture due to movement of the light can be emphasized.

Figure 8:
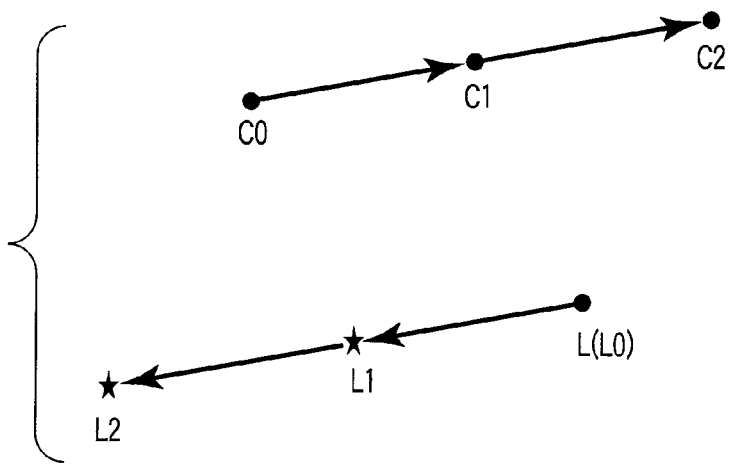
FIG. 8 is a view illustrating a method of emphasizing changes in the position of a light when the position of a camera as a single viewpoint is shifted.

Further, emphasis of changes in light position as shown in FIG. 8 can be performed. This method can be applied also to the emphasis of CG data obtained when the light position does not shift. For instance, when light position data L exists and the camera position is shifting from C0 to C2 in units of frames, the vector that indicates a change from C0 to C1 in camera position is calculated, and the light position is shifted in the direction opposite to the vector. As a result, virtual light data L1 when the camera position is C1 can be obtained. The distance of movement of the light can be determined from the light-position change emphasis rate employed. Similarly, L2 is obtained, whereby virtual light movement of a relatively large change rate with respect to the camera work can be realized. By calculating two light conditions using the virtual light movement, changes in texture due to shift of the camera can be emphasized.

Further, concerning the emphasis of changes in light, changes in appearance can be emphasized by changing the intensity of light with time, in addition to the above-mentioned processing.

(4) Emphasis Model Shape Condition (for a Single Viewpoint)

Figure 9:
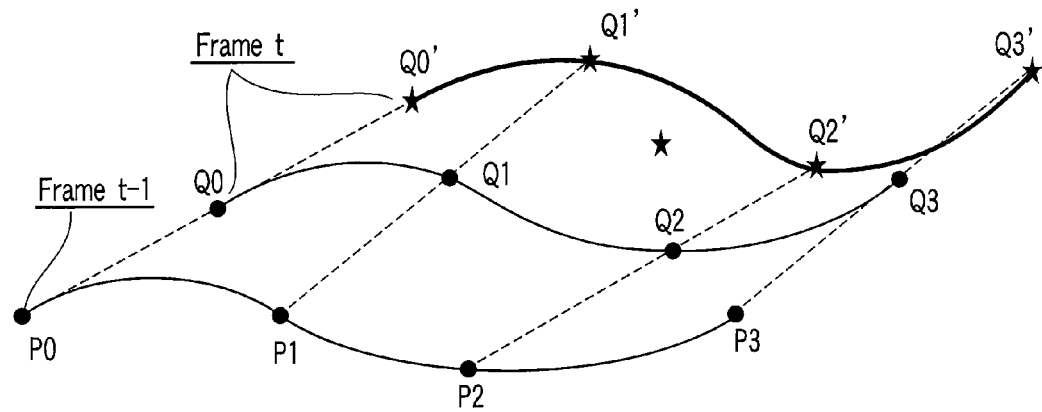
FIG. 9 is a view illustrating a method of emphasizing changes in model shape (animation) when a single viewpoint is employed.

For emphasizing a change in the shape of a CG model, if the CG model is changed in shape in units of frames (i.e., this data is animation data), virtual CG model data is produced using a model-shape emphasis rate, thereby executing model shape emphasis processing. FIG. 9 shows a method of emphasizing changes in model shape. Supposing that CG model data items are obtained at points P0 to P3 (corresponding to vertices of a texture) in frame t−1, and at point Q0 to Q3 in frame t, the vector indicating shift of a point from, for example, point P0 to point Q0 is calculated and then multiplied by a model-shape change emphasis rate, thereby generating virtual vertex Q0' in frame t. Similarly, Q1', Q2' and Q3' are obtained to emphasize a change in model shape between frames t−1 and t. Using the thus-obtained virtual CG model data, viewpoints and light points are calculated, whereby changes in texture between frames (e.g., animation texture) can be emphasized. However, in CG data in which the number of vertices varies between frames, corresponding vertices may not exist. In this case, it is necessary to perform vertex division processing whenever it is determined that no corresponding vertices exist, to thereby generate corresponding vertices.

Figure 10:
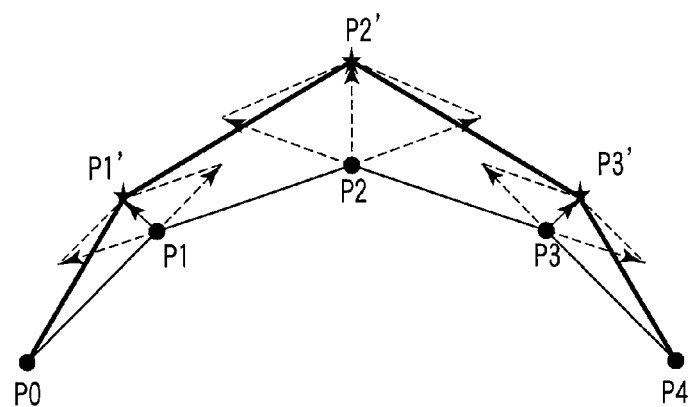
FIG. 10 is a view illustrating a method of emphasizing changes in model shape when a single viewpoint is employed.

Further, model-shape change emphasis as shown in FIG. 10 can be performed. The shown method can be also applied to CG data other than CG animation. When CG model data includes vertices P0 to P4, a change in model shape itself can be emphasized by emphasizing a change in adjacent vertices. In the case of, for instance, P2, the vector indicating a change in position from P1 to P2, and the vector indicating a change in position from P3 to P2 are calculated and then each multiplied by a model condition emphasis rate. The resultant vectors are added to calculate virtual vertex P2'. Similarly, virtual vertices P1' and P3' are obtained, thereby emphasizing a change in model shape itself.

However, it is not necessary to fix the model condition emphasis rate at a certain value. For instance, when only a model shape formed of vertices P0 to P4 is emphasized as shown in FIG. 10, vertices P0 and P4 may not be emphasized, vertex P2 be emphasized using a certain model condition emphasis rate, and vertices P1 and P3 be emphasized using have the certain model condition emphasis rate. Alternatively, the vertex closest to a camera or light may be emphasized using a certain model condition emphasis rate, and the vertices around this vertex be emphasized using gradually reduced certain model condition emphasis rates, instead of directly designating the range of vertices to set a to-be-emphasized model shape area. In this case, it is necessary to input a reduction rate for determining how the model condition emphasis rate is reduced in accordance with the distance between each vertex and the vertex closest to the camera or light. By calculating a viewpoint condition and light condition using such virtual CG model data as the above, changes in texture can be emphasized with respect to changes in model shape.

The above-described conditions (1) to (4) are examples of emphasis processing conditions. All or some of the emphasis conditions may be simultaneously employed. What kind of emphasis is performed depends on the way of setting emphasis parameters.

Figure 11:
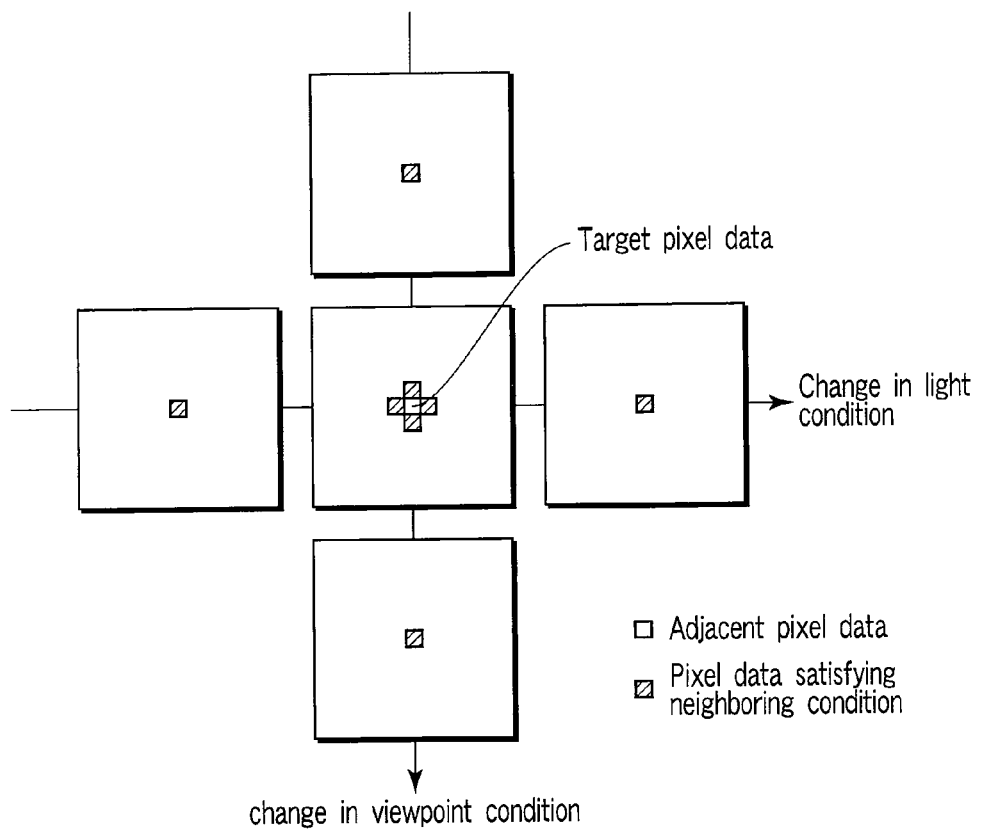
FIG. 11 is a view illustrating a method of emphasizing changes in color when a single viewpoint is employed.

Referring to FIG. 11, a description will be given of emphasis of a change in color (for a single viewpoint) performed by the texture data processing unit 104 using a color change emphasis rate (for a single viewpoint) set as an emphasis parameter.

In emphasis of a change in color, a change in the color of texture data depending on a change in a camera position condition or light condition is emphasized to generate virtual color data. When attention is paid to certain pixel data included in a certain texture, pixel data, which is included in a texture obtained under a neighboring viewpoint condition or light condition and is located at the same position as the certain pixel data, can also be extracted. FIG. 11 shows the one-dimensional change domain of each of viewpoint and light conditions. Actually, however, the embodiment employs a two-dimensional change domain (i.e., light condition changes ($\theta_C, \phi_C$) and viewpoint condition changes ($\theta_I, \phi_I$)). In this case, the vector indicating a change in color data between target pixel data and pixel data of a neighboring condition is calculated, and is then multiplied by a preset color change emphasis rate. After that, these emphasized vectors are superimposed, with the result that virtual color data can be produced with respect to the target pixel data. The virtual color data thus produced during texture processing enables a change in texture to be emphasized with respect to a change in viewpoint or light condition.

Further, spatial emphasis of a single texture can be realized. When attention is paid to certain pixel data, pixel data items spatially close to the former can also be extracted, as shown in FIG. 11. In this case, the vector indicating a change in color data between the target pixel data and each of the pixel data items spatially close thereto is calculated, and the vectors are multiplied by a certain color change emphasis rate and then superimposed. As a result, virtual color data with respect to the target pixel data can be obtained. The virtual color data thus produced during texture processing enables a spatial change in texture to be emphasized.

Further, if texture data is replaced with model data obtained using functions, the same emphasis as the above-mentioned color change emphasis can be realized by increasing the output values of the functions.

Emphasized texture data can be output by performing texture data processing as described above. In the texture generation apparatus shown in FIG. 3, the texture data is output from this apparatus. In the texture mapping apparatus shown in FIG. 1, the mapping unit 105 maps the texture data to CG model data, and the CG presentation unit 106 lastly presents a rendered CG image.

Note that the texture mapping apparatus of FIG. 1 can receive texture data from the texture generation apparatus of FIG. 3.

As described above, in the first embodiment, when texture data to be mapped is selected from a plurality of sheets of texture data acquired or produced under different conditions, a selection condition is calculated by emphasizing a change in camera position, in light position or intensity, or in the shape of a CG model. Further, texture data to be mapped to a CG model is produced by emphasizing a change in the color of the selected texture data. As a result, material feel and/or CG stereoscopic effect can be enhanced.

Further, the load of calculation for texture mapping processing can be reduced by inputting beforehand emphasized texture data.

SECOND EMBODIMENT

A second embodiment is directed to a case where the texture mapping apparatus of FIG. 1 or the texture generation apparatus of FIG. 3 renders a CG image, using a plurality of cameras (i.e., using a plurality of viewpoints). Namely, a description will be given of emphasis processing performed for rendering using a plurality of viewpoints. Since the entire flow has already been described in the first embodiment referring to FIGS. 2 and 4, only different processing will be described in the second embodiment.

Figure 12:
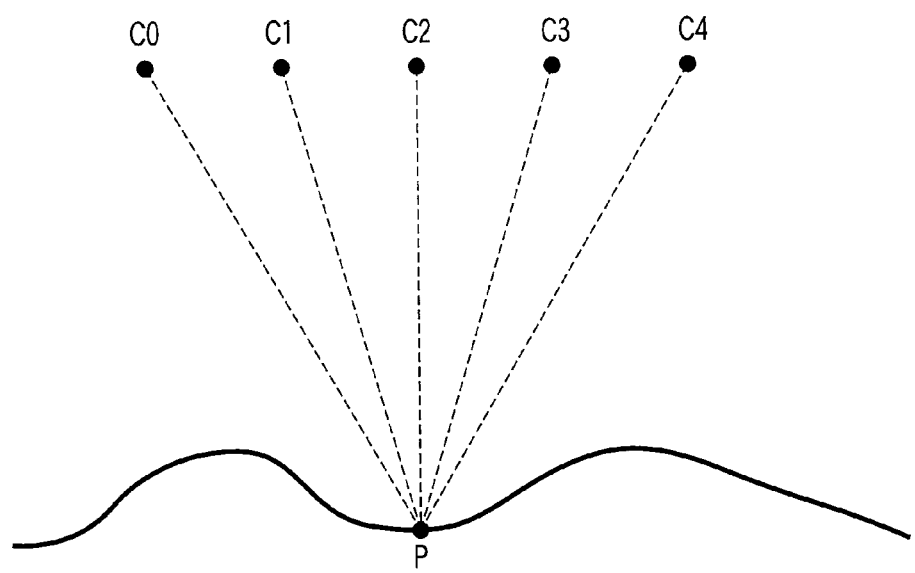
FIG. 12 is a view useful in explaining rendering performed using a plurality of viewpoints.

In rendering using a plurality of viewpoints, the data items (C0, C1, C2, C3 and C4) acquired by, for example, five cameras (C0, C1, C2, C3 and C4) as shown in FIG. 12 are defined as CG data items, and a CG image is rendered using the CG data items. Note that it is assumed that C0, C1, C2, C3 and C4 indicate both the positions of the cameras and the data items. This rendering is performed when images (element images) to be displayed mainly on a stereoscopic display are formed. In this case, emphasis processing different from that employed in the first embodiment can be performed.

Firstly, a description will be given of calculation of processing conditions performed to select texture data, to be mapped to a CG model or to be produced, from a plurality of sheets of texture data obtained by photography by the processing condition calculation unit 102 (step S202).

In the second embodiment, calculation methods for various processing conditions are determined in accordance with preset emphasis parameters. For example, (5) a camera-position change emphasis rate (for a plurality of viewpoints), (6) a light change emphasis rate (for a plurality of viewpoints), and (7) a model shape emphasis rate (for a plurality of viewpoints) are used as preset emphasis parameters to emphasize changes in camera position, light and model shape conditions, thereby calculating processing conditions. The emphasis methods and their advantages will be described.

(5) Emphasis Camera-position Condition (for a Plurality of Viewpoints)

Figure 13:
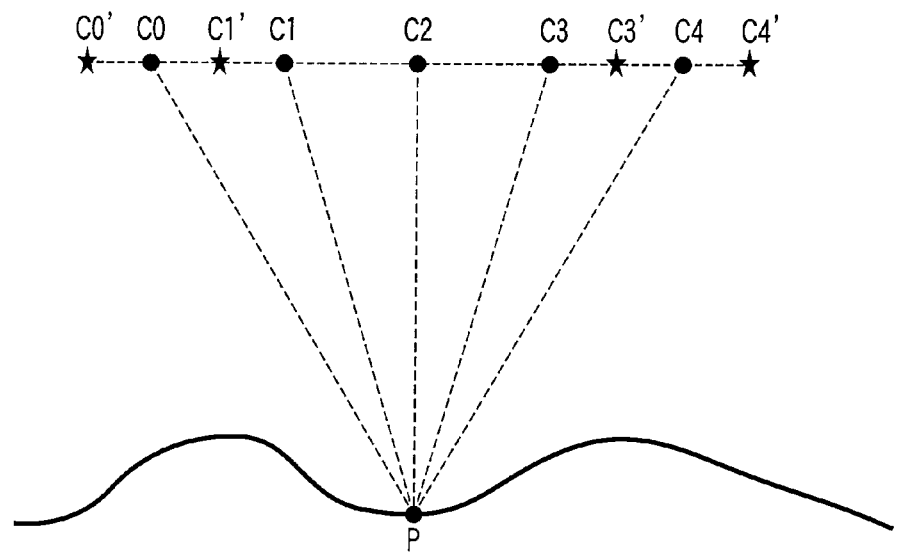
FIG. 13 is a view illustrating a method of emphasizing changes in the positions of cameras as a plurality of viewpoints.

In an emphasis camera-position condition, since a plurality of camera data items are defined as CG data for rendering performed using a plurality of viewpoints, they can be changed to virtual data using a camera-position emphasis rate. FIG. 13 shows a camera-position change emphasis method. When a plurality of camera data items, i.e., C0 to C4, are defined, and the camera data at C2 indicates a reference camera, the vector indicating a change in camera position from, for example, C2 to, for example, C3 is calculated and multiplied by a certain camera-position change emphasis rate. Using this emphasis vector, virtual camera position C3' is calculated. Similarly, C0', C1' and C4' are calculated, whereby a plurality of virtual camera data items (or virtual camera positions) can be defined. Using these virtual camera data items, a plurality of viewpoint conditions are calculated, whereby changes in texture corresponding to changes in camera positions (viewpoints) can be emphasized.

When rendering is executed for stereoscopic display, using a plurality of cameras, it may be executed with the intervals of the cameras reduced compared to the actual intervals, in order to enhance a CG stereoscopic effect. In this case, however, the differences in parallax between the cameras are inevitably reduced although the stereoscopic effect is enhanced. To avoid this, the above-mentioned method can be used. Namely, the texture obtained can be corrected by returning, to the original positions, the cameras having their intervals narrowed.

Figure 20:
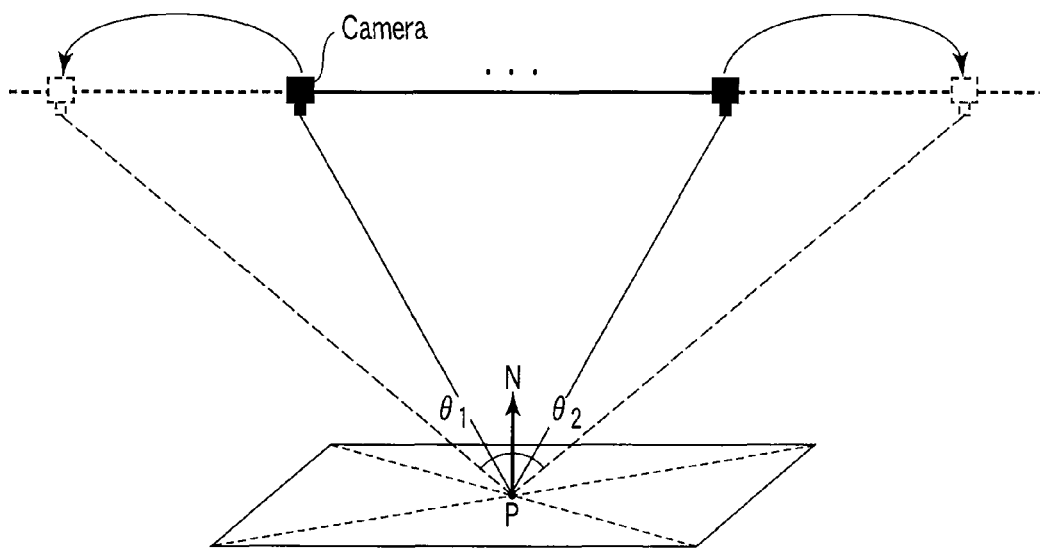
FIG. 20 is a view useful in explaining the limits detected when emphasis processing independent of CG model data is executed.

However, when a plurality of cameras are located at regular intervals on a certain line (this line will hereinafter be referred to as "the camera shift line"), there is a certain limit on the method of uniquely defining virtual camera data regardless of CG model data, unlike the above-mentioned case. The operation of enlarging the intervals of the cameras regardless of CG model data merely means the operation of performing appropriate emphasis only on a point P that is located at the center of an object to be photographed, and has its normal vector N set vertical with respect to the camera shift line, as is shown in FIG. 20. Further, the period of time when, at the point P, the greatest change in texture with respect to a change in the position of the camera is obtained and the rendering of texture is enhanced is until the conditions $\theta_1$ and $\theta_2$ for the polar angles of the cameras located at the opposite ends on the shift line reach the limit condition ($\theta_{limit}$) acquired as texture data, while the intervals of the cameras are increased. Accordingly, the polar angle limit $\theta_{limit}$ may be used as a criterion for determining the camera intervals. It should be noted that even if the polar angle limit $\theta_{limit}$ is beforehand acquired as texture data, there may be a material whose texture is hard to render if the polar angle is too large. Furthermore, if the camera intervals are enlarged regardless of CG model data, the following problem will occur:

i) Meaningless emphasis will occur.

ii) Flip horizontal will occur.

Figure 21:
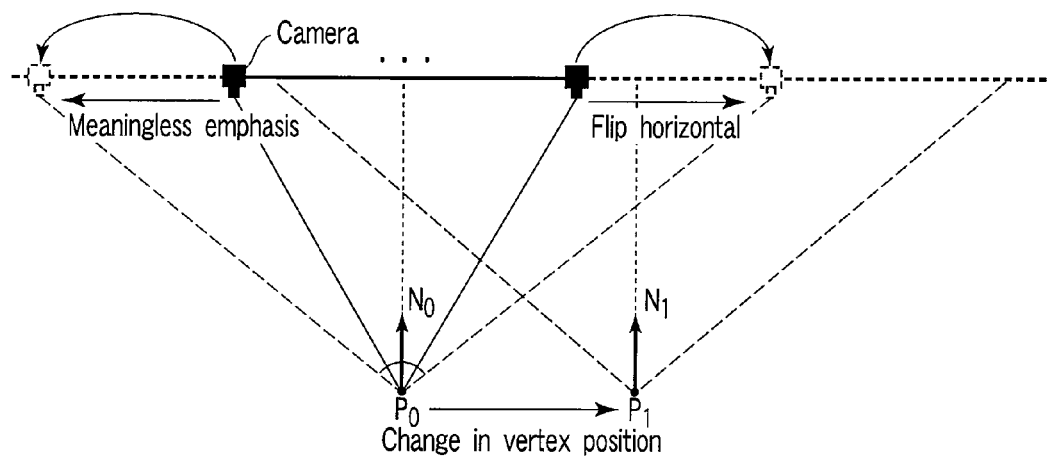
FIG. 21 is a view useful in explaining a first problem that occurs when emphasis processing independent of CG model data is executed.

These problems occur when the vertex position is shifted from the point P in FIG. 20, or when the normal vector N of the vertex is varied. FIG. 21 shows the problems that occur when the vertex position is varied. It can be understood from FIG. 21 where the camera intervals are determined with respect to point $P_0$, based on the camera polar angle limit, the above-mentioned two problems occur at point $P_1$ to which the vertex position is shifted. For instance, the leftmost camera defines virtual camera data in an area larger than a polar-angle limit area, i.e., meaningless emphasis is performed. Further, although the rightmost camera views point P1 from the left, the corresponding virtual camera performs sampling of a texture as if this texture was viewed from the right.

Figure 22:
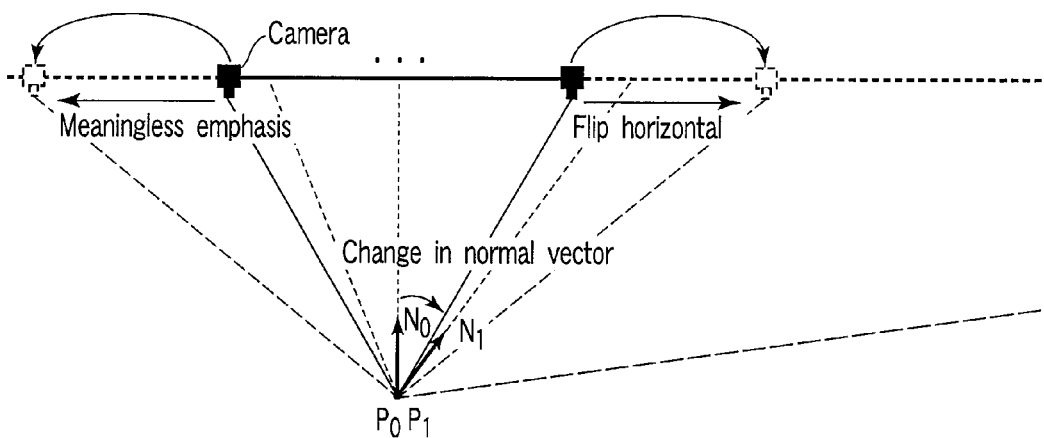
FIG. 22 is a view useful in explaining a second problem that occurs when emphasis processing independent of CG model data is executed.

FIG. 22 shows the problems that occur when the normal vector is varied. It can be understood from FIG. 22 where the camera intervals are determined with respect to normal vector $N_0$ at point $P_0$, based on the camera polar angle limit, the above-mentioned two problems occur at point $P_1$ to which the normal vector is shifted.

Figure 23:
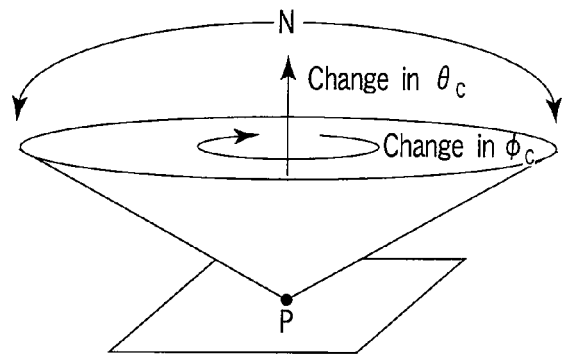
FIG. 23 is a schematic view illustrating the range of each camera position condition for rendering the texture of a material.

In consideration of the cases where the above problems become marked, a description will now be given of a method of emphasizing changes in camera position in accordance with CG model data. As described above, when various texture data items obtained under various conditions are used, the range of each camera position condition, under which the texture of a material can be rendered each point on CG model data, is limited. Although the same can be said of the light condition, only the range of each camera position condition will be described for facilitating the description. FIG. 23 schematically shows the range of each camera position condition under which texture rendering is possible. Assume here that texture data is obtained under a plurality of camera position conditions. In this case, for instance, the range of the angle of direction can be set to 0° to less than 360°, and the range of the polar angle can be set to 0° to a certain polar angle limit (e.g., 50° or 70°). Accordingly, in FIG. 23, it is considered that the ranges of camera conditions, under which texture rendering at the point P is possible, are those indicated by the arrows. Further, it is considered that "most effective use of the ranges of camera conditions, under which texture rendering at each point is possible, leads to emphasis of texture." In light of this, an algorithm for texture emphasis based on CG model data has been devised.

The following conditions have been mainly considered to devise the algorithm:

<1> Virtual cameras are located at regular intervals;
<2> Virtual cameras are located on the camera shift line;
<3> Meaningless emphasis is avoided;
<4> Flip horizontal is avoided; and
<5> Spatial continuity is maintained.

Condition <1> is provided for maintaining the continuity of the images rendered using the cameras, and condition <2> is provided for preventing the parallax due to the movement of each camera from fluctuating. Conditions <3> and <4> are provided for overcoming the problems involved in emphasis that does not depend upon CG model data. Condition <5> is added since when different textures corresponding to the positions of vertices and normal vectors are sampled, they must be at least continuous with each other.

Figure 24:
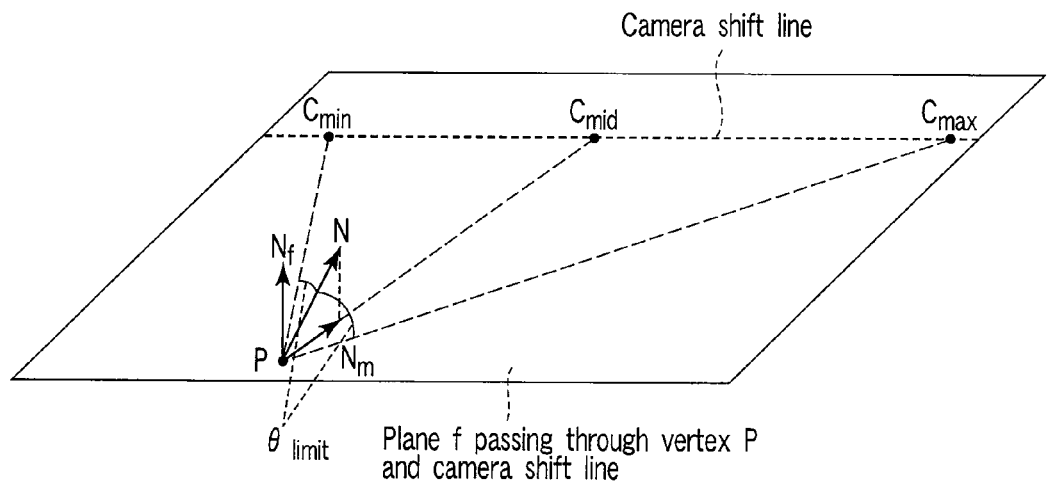
FIG. 24 is a view useful in explaining three points necessary to perform emphasis processing depending on CG model data.

A description will firstly be given of three points $C_{min}$, $C_{mid}$ and $C_{max}$ on the camera shift line, which are needed to consider an algorithm that satisfies the above conditions. FIG. 24 shows the three points on the camera shift line. Concerning vertex P having a normal vector N and the camera shift line, firstly, the points on the camera shift line, at which the camera position condition is equal to the polar angle limit $\theta_{limit}$, are calculated and set as $C_{min}$ and $C_{max}$ (the process performed when such two points do not exist will be described later). Further, vector $N_m$ obtained by projecting the normal vector N on a plane f that passes the vertex P and camera shift line is calculated. The intersection of the camera shift line and the line obtained by extending the vector $N_m$ from the point P is set as $C_{mid}$. These three points are important points that indicate the camera position condition range ($C_{min}$, $C_{max}$) in which texture rendering at the point P is possible, and the camera position ($C_{mid}$) at which flip horizontal occurs.

Figure 25:
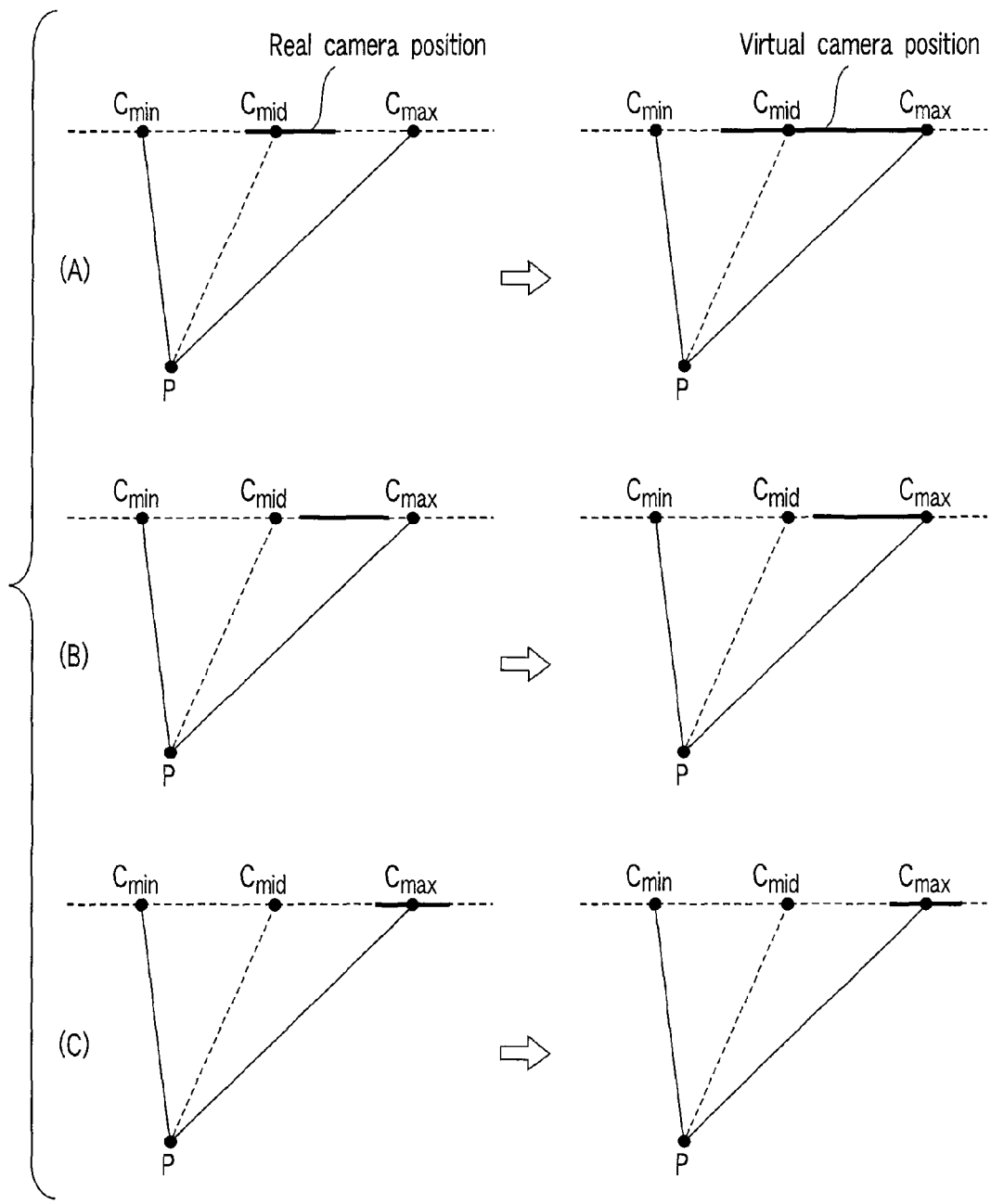
FIG. 25 is a view illustrating the methods of changing the intervals of cameras, depending on CG model data.

A description will hereinafter be given of a method of enlarging the camera interval as much as possible with the above-mentioned conditions satisfied, using the relationship between the three points and the original camera positions. In this case, virtual cameras can be located as shown in (A), (B) and (C) of FIG. 25. Assume that when all cameras are located in the camera position condition range ($C_{min}$, $C_{max}$) in which texture rendering is possible, and are located so that the position $C_{mid}$ is interposed therebetween, scaling is performed until the leftmost or rightmost virtual camera, with respect to the position $C_{mid}$ as the center, reaches the position $C_{min}$ or $C_{max}$. Assume also that when the cameras are located without interposing the position $C_{mid}$ therebetween, scaling is executed using the camera closest to $C_{mid}$ as the origin, until the camera remotest from $C_{mid}$ reaches $C_{min}$ or $C_{max}$. In contrast, assume that if at least one of the cameras is not located in the camera position condition range ($C_{min}$, $C_{max}$) in which texture rendering is possible, camera shifting is not performed.

Figure 26:
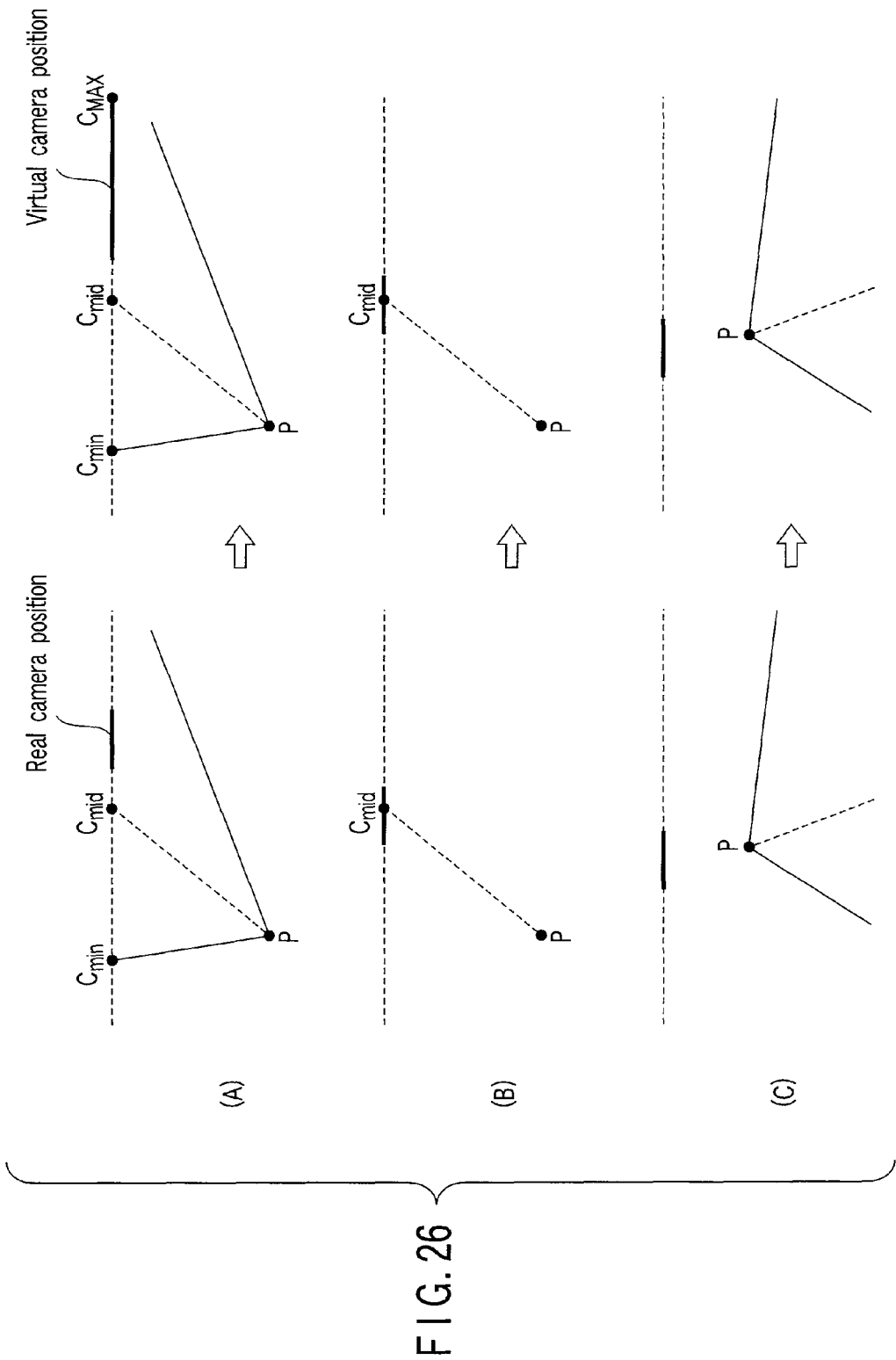
FIG. 26 is a view illustrating exceptional processing included in the methods of changing the intervals of cameras, depending on CG model data.

Further, such exceptional processing as shown in FIG. 26 is also needed. If $C_{min}$ or $C_{max}$ is a too low or high value, or does not exist, a sufficiently low value $C_{MIN}$ or a sufficiently high value $C_{MAX}$ is prepared, and the camera condition range for enabling texture rendering is defined. Further, if neither $C_{min}$ nor $C_{max}$ nor $C_{mid}$ exists, camera shifting is not performed.

Figure 27:
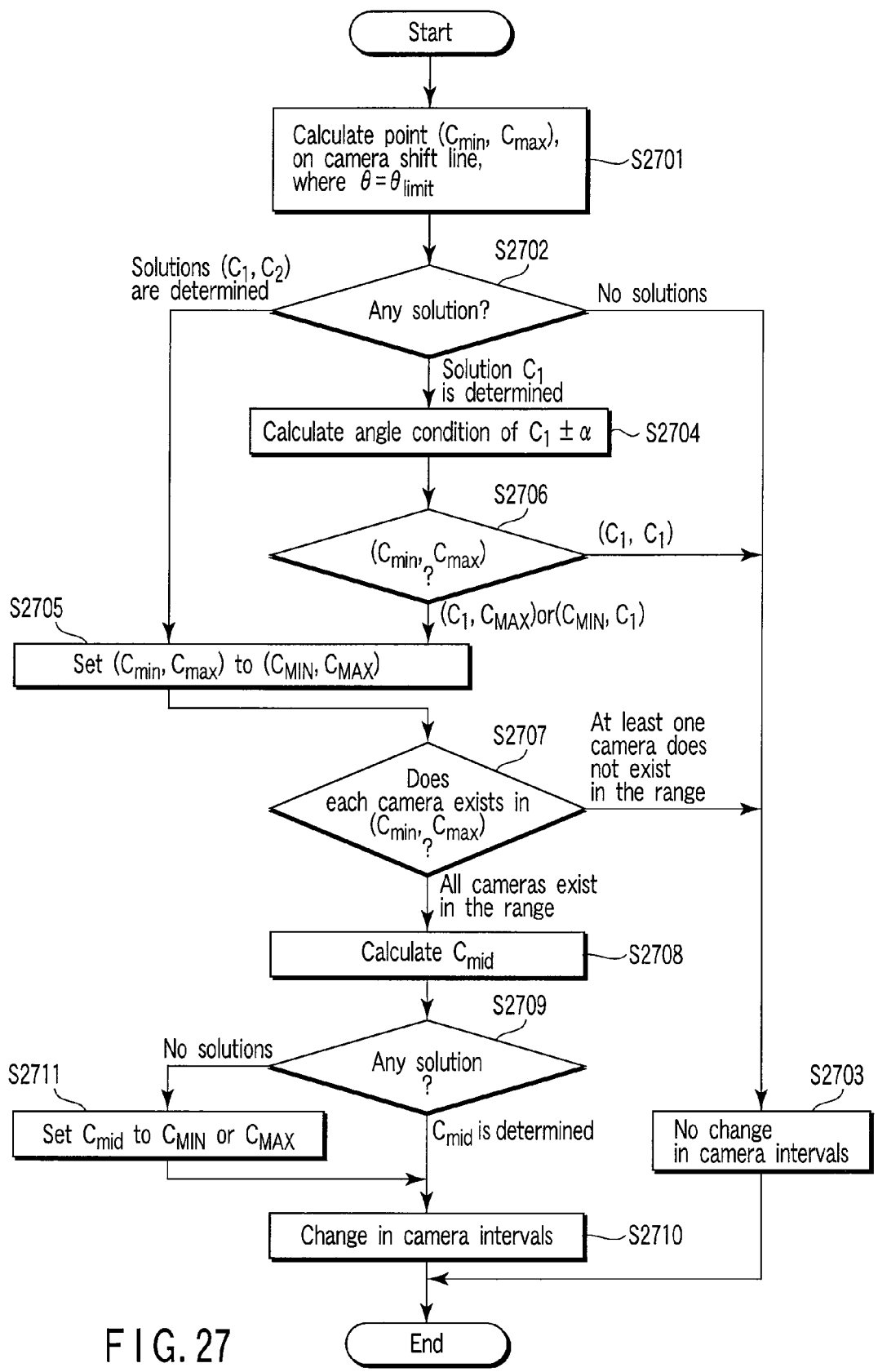
FIG. 27 is a flowchart illustrating a method of emphasizing changes in camera position depending on CG model data.

FIG. 27 is a flowchart useful in explaining the above-described algorithm and its exceptional processing. Firstly, $C_{min}$ and $C_{max}$ are calculated (step S2701). If there are two solutions, the program proceeds to step S2705. If there is no solution, camera shift is not performed, i.e., the camera intervals are maintained as they are (steps S2702, S2703). If only a single solution exists, angle conditions to be set when cameras are located at the opposite sides of the solution (camera position) are calculated (steps S2702, S2704), thereby determining whether the camera position condition range, in which texture rendering is possible, exists at the left side of the solution (camera position) or at the right side of the same (step S2706). After that, the program proceeds to step S2705. At step S2705, $C_{min}$ and $C_{max}$ are set to $C_{MIN}$ and $C_{MAX}$, respectively. Subsequently, it is determined at step S2707 whether each of the cameras exists in the camera position condition range ($C_{min}$, $C_{max}$) in which texture rendering is possible. If no camera exists in this range, no camera shifting is performed (step S2703). In contrast, if all cameras exist in the range, $C_{mid}$ is calculated for the first time (step S2708). If $C_{mid}$ exists, the program proceeds to step S2711. If $C_{mid}$ does not exist, this means that one of $C_{min}$ and $C_{max}$ is set to the corresponding one of $C_{MIN}$ and $C_{MAX}$. In this case, if $C_{min}$ is set to $C_{MIN}$, $C_{mid}$ is also set to $C_{MIN}$, while if $C_{max}$ is set to $C_{MAX}$, $C_{mid}$ is also set to $C_{MAX}$ (steps S2709, S2711). Thereafter, the program proceeds to step S2710. At step S2710, camera shift, i.e., camera interval change, is performed. These scaling processes are performed in accordance with the camera shift operation.

The above-described camera-position change emphasis, based on CG model data, enables spatial color changes in a certain camera or changes in color between cameras to be emphasized.

(6) Emphasis Light Condition (for a Plurality of Viewpoints)

Figure 14:
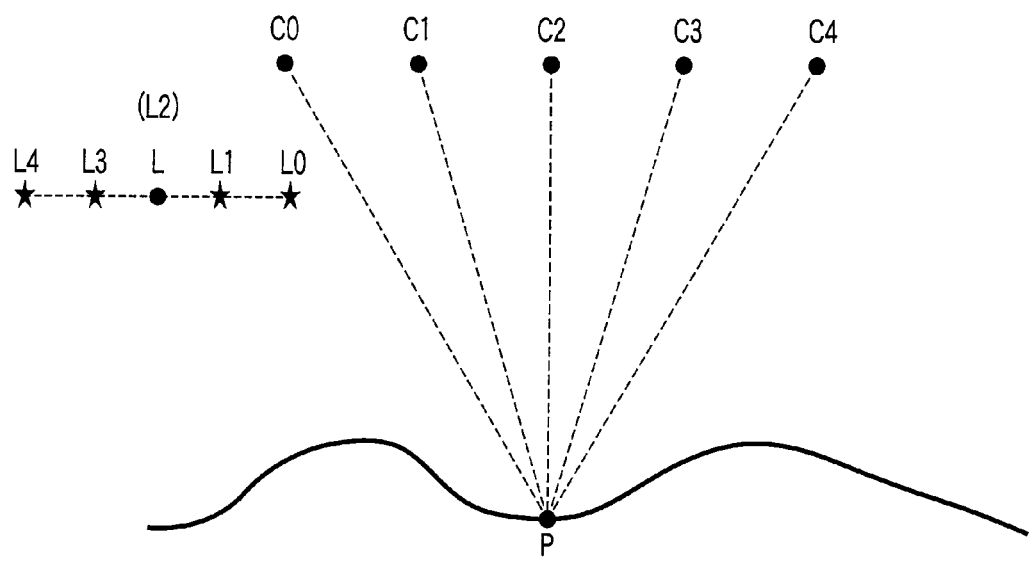
FIG. 14 is a view illustrating a method of emphasizing changes in the position of a light when a plurality of viewpoints are employed.

In an emphasis light condition, light source data is shifted in a virtual manner with respect to each of the camera data items defined. FIG. 14 is a view useful in explaining emphasis of changes in light position. Assume here that a plurality of camera positions C0 to C4 (C2 corresponds to a reference camera) and a single light data item, "L" ("L" also indicates a light position), are defined. In this case, if the vector indicating a change in camera position, for example, from C2 to C3, is calculated, and the light position is shifted in a direction opposite to the vector, virtual light data L3 corresponding to camera position C3 can be obtained. The shift distance of the light position can be calculated using a light-position change emphasis rate. By obtaining L0, L1 and L4 in the same manner as the above, virtual light data is obtained which indicates great changes in light position relative to changes in camera position (viewpoint). By calculating a light position condition using the virtual light data, changes in texture relative to changes in camera position (viewpoint) can be emphasized.

Further, concerning the emphasis of changes in light, changes in appearance can be emphasized by changing the intensity of light in accordance with changes in viewpoint, in addition to the above-mentioned processing. For instance, if the intensity of light is increased for the reference camera, and is reduced for cameras remote from the reference camera, changes in data obtained by different cameras (viewpoints) can be further emphasized.

(7) Emphasis Model-Shape Condition (for a Plurality of Viewpoints)

Figure 15:
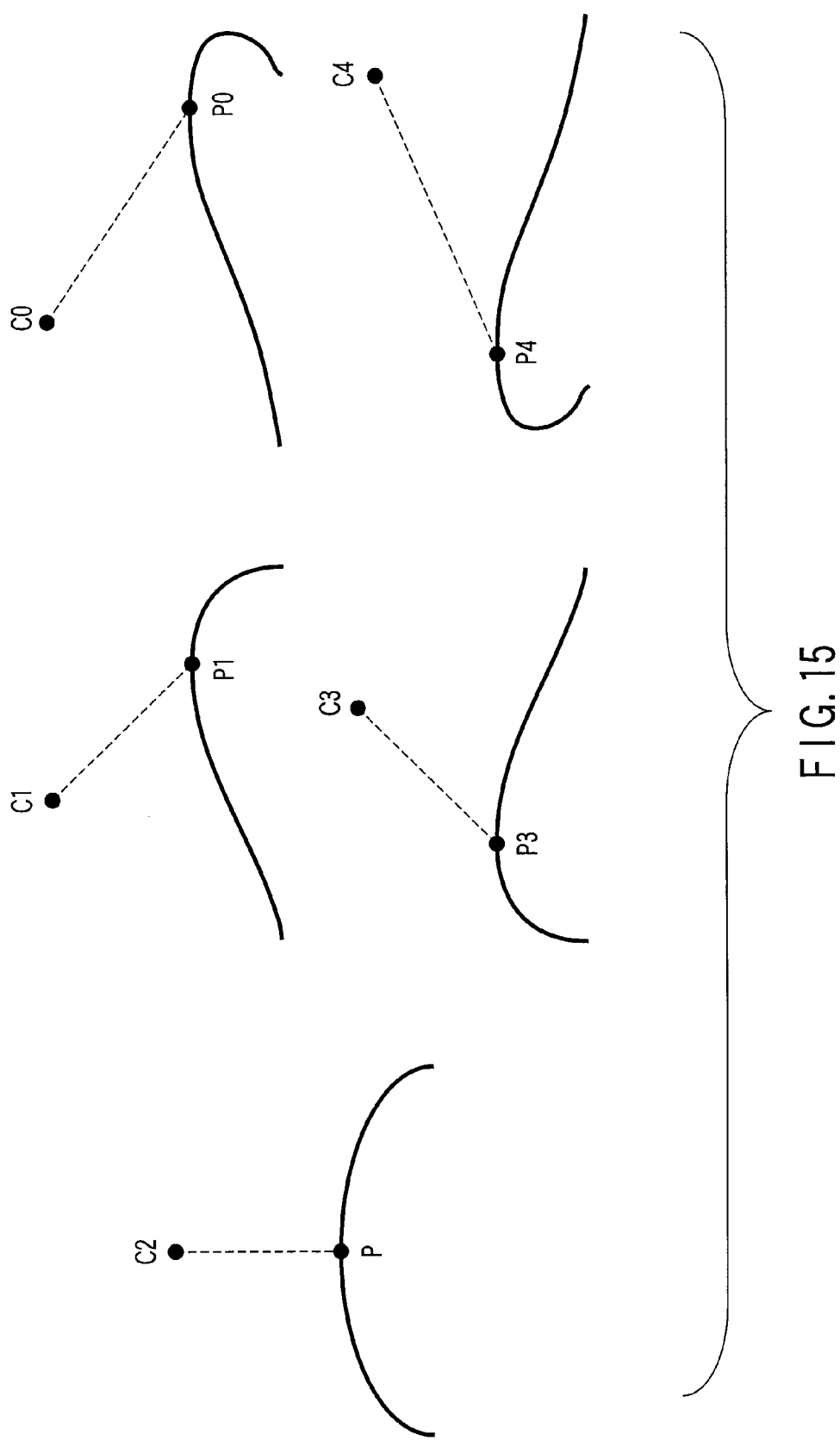
FIG. 15 is a view illustrating a method of emphasizing changes in model shape when a plurality of viewpoints are employed.

In an emphasis model-shape condition, CG model data is varied in a virtual manner with respect to each camera data item defined. FIG. 15 is a view useful in explaining a method of emphasizing changes in model shape. Assume that CG model data including a plurality of camera positions C0 to C4 (C2 corresponds to a reference camera) and vertex P is defined. In this case, if the vector indicating a change in camera position, for example, from C2 to C3, is calculated, and the CG model data (e.g., the vertex P) is shifted in a direction opposite to the vector, virtual CG model data (e.g., vertex P3) corresponding to camera position C3 can be obtained. Similarly, P0, P1 and P4 can be obtained. Concerning the shift distance of the CG model data, the rate at which the CG model data is shifted relative to the shift amount of camera position can be determined using a model-shape change emphasis rate. It is not always necessary to impart a single model-shape change emphasis rate to all vertices. For instance, emphasis processing as shown in FIG. 15 may be employed. Namely, the vertex P closest to the reference camera position C2 is emphasized using a designated model-shape change emphasis rate, and the vertices around the vertex P are emphasized while the model-shape change emphasis rate is gradually reduced. In this case, it is necessary to input a reduction rate used for determining to what degree the model-shape change emphasis rate is reduced, in accordance with the distance from the vertex P. By calculating a viewpoint condition and light condition using the virtual CG model data, changes in texture relative to changes in camera position (viewpoint) can be emphasized, which enables the texture to be seen stereoscopically.

The above-described conditions are examples of emphasis processing conditions for rendering using a plurality of viewpoints. All or some of the emphasis conditions may be simultaneously employed. What kind of emphasis is performed depends on the way of setting emphasis parameters.

A description will now be given of the feature of step S204, where the texture data processing unit 104 performs processing on the texture data extracted. In the second embodiment, texture data is emphasized using a certain preset emphasis parameter. Specifically, changes in color are emphasized using a color change emphasis rate (for a plurality of viewpoints) set as the emphasis parameter.

For color change emphasis, color data items are extracted from the respective camera data items defined, and changes between color data items are emphasized using a color change emphasis rate to thereby generate virtual color data. Assuming that a plurality of camera positions C0 to C4 (C2 corresponds to a reference camera) are defined as shown in FIG. 12, pixel data (color data) can be extracted from each camera data item. For instance, if the vector indicating a change in color data, for example, from C2 to C3, is calculated and multiplied by a color change emphasis rate. Using the thus-obtained vector, virtual color data corresponding to camera position C3 can be obtained. Similarly, virtual color data items corresponding to C0, C1 and C4 can be obtained. By generating such virtual color data during texture processing, changes in texture relative to changes in camera position (viewpoint) can be emphasized.

In the second embodiment, changes in CG data obtained by a plurality of cameras can be emphasized by performing rendering using a plurality of viewpoints, as described above. This emphasizing method not only enhances stereoscopic rendering on a stereoscopic display, but also provides the advantage that the viewpoints can be shifted over a wide range in a virtual manner (i.e., a wide field of view can be secured).

THIRD EMBODIMENT

In a third embodiment, a description will be given of a texture processing apparatus (the texture mapping apparatus of FIG. 16 and the texture generation apparatus of FIG. 18) that contains no emphasis parameters and acquires external emphasis parameters. These apparatuses are obtained by adding an emphasis parameter acquisition unit 1601 to the texture mapping apparatus of FIG. 1 and the texture generation apparatus of FIG. 3. Note that a processing condition calculation unit 1602 employed in the third embodiment differs from the processing condition calculation unit of the first and second embodiments only in that the former receives emphasis parameters.

Figure 17:
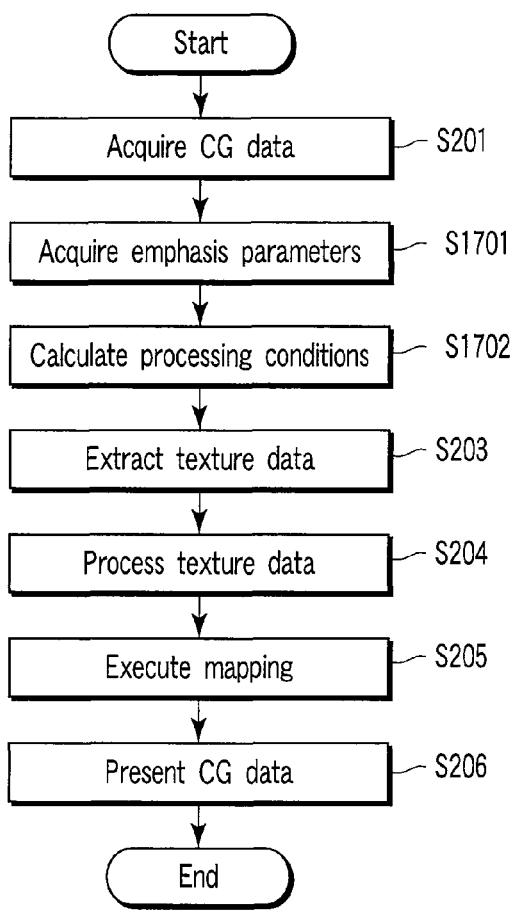
FIG. 17 is a flowchart illustrating an operation example of the texture generation apparatus of FIG. 16.
Figure 19:
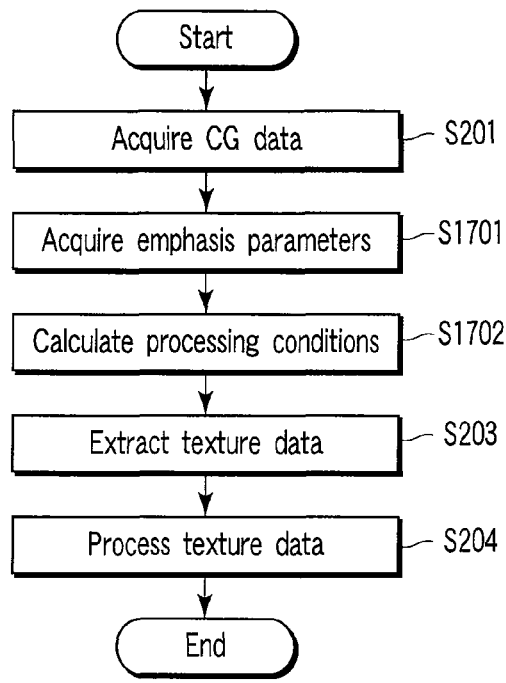
FIG. 19 is a flowchart illustrating an operation example of the texture generation apparatus of FIG. 18.

FIGS. 17 and 19 are flowcharts illustrating the operations of the texture mapping apparatus and texture generation apparatus of the third embodiment, respectively.

Firstly, the emphasis parameter acquisition unit 1601 acquires emphasis parameters (step S1701). Using CG data acquired at step S201, the processing condition calculation unit 1602 calculates emphasis texture processing conditions used to generate a texture in accordance with the emphasis parameters acquired at step S1701 (step S1702). The other processes are the same as those of the first and second embodiments.

As described in the first and second embodiments, various emphasis parameters exist. They include, for example, the emphasis angle condition rate (1), the emphasis camera-position change rate (for a single viewpoint/a plurality of viewpoints) (2) and (5), the emphasis light change rate (for a single viewpoint/a plurality of viewpoints) (3) and (6), the emphasis model shape change rate (for a single viewpoint/a plurality of viewpoints) (4) and (7), and the color change emphasis rate (for a single viewpoint/a plurality of viewpoints). It depends on the required quality of CG images finally presented to which rate each emphasis parameter should be set. A description will be given of how to set each parameter.

<Setting of Emphasis Parameter Corresponding to CG Data>

Setting of an emphasis parameter corresponding to CG data will firstly be described. If input CG data is less dynamic than expected, changes in texture relative to changes in camera position are emphasized by increasing the camera-position change emphasis rate.

Further, when entire changes in texture are desired to be expressed dynamically, if input texture data has less changes, than expected, in viewpoint condition and/or light condition (i.e., the input texture data is less anisotropic), or has less spatial changes in color (i.e., the texture does not have many patterns), the entire changes in texture can be emphasized by increasing the color change emphasis rate.

<Setting of Emphasis Parameter Corresponding to Medium for Presenting CG Data>

Secondly, setting of an emphasis parameter corresponding to a medium for presenting CG data will be described. This setting relates, in particular, to the color representation power of a display or printed matter, or the depth representation power of a stereoscopic display. When a medium of low color representation power is used, contrast may be degraded. Therefore, it would be advisable to set the emphasis rate of each emphasis parameter to a relatively high value. Further, when a medium of low color representation power is used, fine changes can be reproduced without any emphasis, and hence it would be advisable to set the emphasis rate of each emphasis parameter to a relatively low value to thereby render a CG image closer to real substance.

On the other hand, emphasis parameters can also be set in accordance with the depth representation power of a stereoscopic display. In the case of a stereoscopic display with a low depth representation power, the stereoscopic effect can be enhanced by setting a high camera change emphasis rate (for a plurality of viewpoints).

<Setting of Interactive Emphasis Parameter>

Thirdly, setting of an interactive emphasis parameter will be described. Even when an emphasis parameter corresponding to CG data or a medium for presenting CG data is set, there may be a request to adjust the emphasis parameter while observing a rendered CG image. The apparatus employed in the embodiment can perform interactive emphasis parameter setting.

In the above-described third embodiment, CG images satisfying demanded quality can be rendered by user's voluntary emphasis parameter setting.

In the above-described embodiments, when texture data to be mapped is selected from a plurality of texture data items acquired or produced under different conditions, a selection condition for emphasizing a change in camera position, light or CG model shape is calculated. Further, texture data to be mapped to a CG model is produced by emphasizing a color change in selected texture data. As a result, the material feel and/or CG stereoscopic effect can be enhanced.

Figure 18:
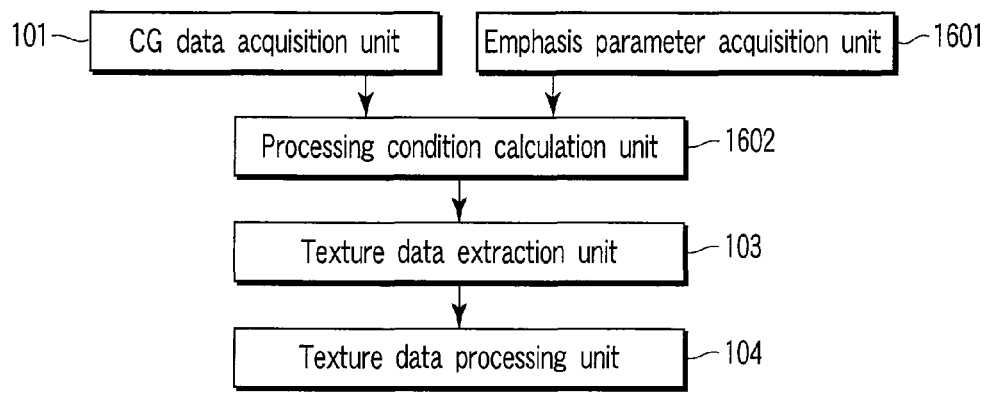
FIG. 18 is a block diagram illustrating a texture generation apparatus employed in the third embodiment.

For instance, changes in texture caused under different conditions can be emphasized using the texture mapping apparatus of FIG. 1 or 16, or the texture generation apparatus of FIG. 3 or 18. The texture mapping apparatus of FIG. 1 or 16 can map the emphasized texture data to a CG model.

Further, as described above, the calculation means for calculating a condition used to select texture data, and the texture data processing means for actually processing a texture can employ various texture emphasis methods. These methods are characterized in that CG data for rendering (i.e., CG model data, camera position data, light data, texture data), and CG data for texture calculation are processed in different ways. It is important to use most effective virtual CG data for texture calculation.

In the above embodiments, texture data is not limited to color data, but may be any vector data. The vector data can be used for emphasized rendering in, for example, shading processing, as well as in texture mapping processing, or for emphasized rendering for data other than CG data. Furthermore, elements employed in different embodiments can be combined appropriately.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A texture processing apparatus comprising:
a CG data acquisition unit configured to acquire calculator graphics (CG) data including CG model data, camera data, light data, texture data items, and a preset emphasis parameter for texture mapping processing, the CG model data, the camera data and the light data, for rendering a CG image, the texture data items being acquired or produced under different conditions;
a calculation unit configured to calculate, using the CG data, an emphasis texture processing condition corresponding to the preset emphasis parameter, the emphasis texture processing condition being used to perform texture mapping processing on a CG model;
an extraction unit configured to extract a particular texture data item from the acquired texture data items in accordance with the texture processing condition; and
a processing unit configured to perform emphasis processing on the particular texture data item in accordance with the preset emphasis parameter to obtain a emphasized texture data item.

2. The apparatus according to claim 1, further comprising:
a mapping unit configured to map the emphasized texture data item to the CG model to produce a CG image; and
a presentation unit configured to present the CG image.

3. The apparatus according to claim 1, wherein the calculation unit calculates, for each point included in the CG model data, a camera condition indicating a first positional relationship between each point and the camera data, and a light condition indicating a second positional relationship between each point and the light data, the camera condition and the light condition being represented by angles, and the calculation unit multiplies the camera condition and the light condition by an angle condition emphasis rate as the emphasis parameter, to calculate the emphasis texture processing condition which emphasize the camera condition and the light condition.

4. The apparatus according to claim 1, wherein when the CG data is obtained at a camera position or a light position shifted in units of frames, the calculation unit generates virtual camera data or virtual light data in the frame by emphasizing, in accordance with a camera change emphasis rate for a single viewpoint or a light change emphasis rate for the single viewpoint, a vector indicating a difference in the camera position or the light position between a frame and a preceding frame to shift the camera position or the light position in the frame, the camera change emphasis rate or the light change emphasis rate being the emphasis parameter, and the calculation unit calculates, as the emphasis texture processing condition, a camera condition indicating a first positional relationship between each point on the model data and the virtual camera data, or a light condition indicating a second positional relationship between each point of the CG model data and the virtual light data.

5. The apparatus according to claim 1, wherein when the CG data varies in units of frames, the calculation unit generates first virtual CG model data by emphasizing, in accordance with a model change emphasis rate for a single viewpoint, a first vector indicating a first difference in position coordinates of a vertex in the CG data between a frame and a preceding frame, the calculation unit generates second virtual CG model data by emphasizing, in accordance with a model change emphasis rate for a single viewpoint, a second vector indicating a second difference in position coordinates in the CG data in the frame between the vertex and another vertex adjacent thereto, and the calculation unit calculates, as the emphasis texture processing condition, a camera condition indicating a first positional relationship between each point on the first or second virtual CG model data and the camera data, and a light condition indicating a second positional relationship between each point and the light data.

6. The apparatus according to claim 1, wherein when the texture data items differ in accordance with conditions, the processing unit generates first virtual color data by emphasizing, in accordance with a color change emphasis rate for a single viewpoint, a first vector indicating a first difference between first color data included in the texture data items and obtained at a pixel position under a condition, and second color data included in the texture data items and obtained under a neighboring condition, the color change emphasis rate being the emphasis parameter, the processing unit generates second virtual color data by emphasizing, in accordance with the color change emphasis rate for the single viewpoint, a second vector indicating a second difference between third color data at a pixel position and fourth color data at a neighboring position, and the processing unit outputs the first or second virtual color data as emphasized texture data.

7. The apparatus according to claim 1, wherein when the CG data includes a plurality of camera data items, the calculation unit generates virtual camera data by emphasizing, in accordance with a camera change emphasis rate for a plurality of viewpoints, a first vector indicating a first difference between a camera position indicated by one of the camera data items and another camera position indicated by neighboring one of the camera data items, and by changing the camera position, the calculation unit generates virtual light data by changing a light position in accordance with a light change emphasis rate for a plurality of viewpoints and a change in the camera data items, the camera change emphasis rate and the light change emphasis rate being the emphasis parameter, and the calculation unit calculates, as the emphasis texture processing condition, a camera condition indicating a first positional relationship between each point on the CG model data and the virtual camera data and a light condition indicating a second positional relationship between each point and the virtual light data.

8. The apparatus according to claim 1, wherein when the CG data includes a plurality of camera data items and corresponds to a vertex, the calculation unit generates virtual CG model data by emphasizing, in accordance with a model change emphasis rate for a plurality of viewpoints, a vector indicating a difference in position coordinates between one of the camera data items and another camera data item adjacent to the one camera data item, the model change emphasis rate being the emphasis parameter, and the calculation unit calculates, as the emphasis texture processing condition, a camera condition indicating a first positional relationship between each point on the virtual CG model data and each of the camera data items, and a light condition indicating a second positional relationship between each point and the light data.

9. The apparatus according to claim 1, wherein when the CG data includes a plurality of camera data items, the processing unit generates virtual color data by emphasizing, in accordance with a color change emphasis rate for a plurality of viewpoints, a vector indicating a difference between color data corresponding to one of the camera data items and a pixel position and color data corresponding to a camera data item adjacent to the one camera data item, the color change emphasis rate being the emphasis parameter, and the processing unit outputs the virtual color data as emphasized texture data.

10. The apparatus according to claim 2, wherein:
the emphasis parameter includes an angle condition emphasis rate, a camera change emphasis rate for a single viewpoints or a plurality of viewpoints, a light change emphasis rate for a single viewpoints or a plurality of viewpoints, a model change emphasis rate for a single viewpoints or a plurality of viewpoints, and a color change emphasis rate for a single viewpoints or a plurality of viewpoints; and
at least one of the calculation unit and the processing unit uses the emphasis parameter to perform emphasis calculation of the processing conditions or the texture data items, and performs at least one of setting arbitrary selected by a user, setting based on characteristics of the CG data, and setting based on specification of the presentation unit.

11. A texture processing apparatus comprising:
a CG data acquisition unit configured to acquire calculator graphics (CG) data including CG model data, camera data, light data, and texture data items for texture mapping processing, the CG model data, the camera data and the light data composing data for rendering a CG image, the texture data items being acquired or produced under different conditions;
a parameter acquisition unit configured to acquire an emphasis parameter used for texture mapping processing;
a calculation unit configured to calculate, using the CG data, an emphasis texture processing condition corresponding to the emphasis parameter, the emphasis texture processing condition being used to perform texture mapping processing on a CG model;
an extraction unit configured to extract a particular texture data item from the acquired texture data items in accordance with the texture processing condition; and
a processing unit configured to perform emphasis processing on the particular texture data item in accordance with the emphasis parameter to obtain a emphasized texture data item.

12. The apparatus according to claim 11, further comprising:
a mapping unit configured to map the emphasized texture data item to the CG model to produce a CG image; and
a presentation unit configured to present the CG image.

13. The apparatus according to claim 12, wherein:
the emphasis parameter includes an angle condition emphasis rate, a camera change emphasis rate for a single viewpoints or a plurality of viewpoints, a light change emphasis rate for a single viewpoints or a plurality of viewpoints, a model change emphasis rate for a single viewpoints or a plurality of viewpoints, and a color change emphasis rate for a single viewpoints or a plurality of viewpoints; and
the parameter acquisition unit interactively acquires a new emphasis parameter in accordance with a CG image presented on the presentation unit.

14. The apparatus according to claim 11, wherein the calculation unit calculates, for each point included in the CG model data, a camera condition indicating a first positional relationship between each point and the camera data, and a light condition indicating a second positional relationship between each point and the light data, the camera condition and the light condition being represented by angles, and the calculation unit multiplies the camera condition and the light condition by an angle condition emphasis rate as the emphasis parameter, to calculate the emphasis texture processing condition which emphasize the camera condition and the light condition.

15. The apparatus according to claim 11, wherein when the CG data is obtained at a camera position or a light position shifted in units of frames, the calculation unit generates virtual camera data or virtual light data in the frame by emphasizing, in accordance with a camera change emphasis rate for a single viewpoint or a light change emphasis rate for the single viewpoint, a vector indicating a difference in the camera position or the light position between a frame and a preceding frame to shift the camera position or the light position in the frame, the camera change emphasis rate or the light change emphasis rate being the emphasis parameter, and the calculation unit calculates, as the emphasis texture processing condition, a camera condition indicating a first positional relationship between each point on the model data and the virtual camera data, or a light condition indicating a second positional relationship between each point of the CG model data and the virtual light data.

16. The apparatus according to claim 11, wherein when the CG data varies in units of frames, the calculation unit generates first virtual CG model data by emphasizing, in accordance with a model change emphasis rate for a single viewpoint, a first vector indicating a first difference in position coordinates of a vertex in the CG data between a frame and a preceding frame, the calculation unit generates second virtual CG model data by emphasizing, in accordance with a model change emphasis rate for a single viewpoint, a second vector indicating a second difference in position coordinates in the CG data in the frame between the vertex and another vertex adjacent thereto, and the calculation unit calculates, as the emphasis texture processing condition, a camera condition indicating a first positional relationship between each point on the first or second virtual CG model data and the camera data, and a light condition indicating a second positional relationship between each point and the light data.

17. The apparatus according to claim 11, wherein when the texture data items differ in accordance with conditions, the processing unit generates first virtual color data by emphasizing, in accordance with a color change emphasis rate for a single viewpoint, a first vector indicating a first difference between first color data included in the texture data items and obtained at a pixel position under a condition, and second color data included in the texture data items and obtained under a neighboring condition, the color change emphasis rate being the emphasis parameter, the processing unit generates second virtual color data by emphasizing, in accordance with the color change emphasis rate for the single viewpoint, a second vector indicating a second difference between third color data at a pixel position and fourth color data at a neighboring position, and the processing unit outputs the first or second virtual color data as emphasized texture data.

18. The apparatus according to claim 11, wherein when the CG data includes a plurality of camera data items, the calculation unit generates virtual camera data by emphasizing, in accordance with a camera change emphasis rate for a plurality of viewpoints, a first vector indicating a first difference between a camera position indicated by one of the camera data items and another camera position indicated by neighboring one of the camera data items, and by changing the camera position, the calculation unit generates virtual light data by changing a light position in accordance with a light change emphasis rate for a plurality of viewpoints and a change in the camera data items, the camera change emphasis rate and the light change emphasis rate being the emphasis parameter, and the calculation unit calculates, as the emphasis texture processing condition, a camera condition indicating a first positional relationship between each point on the CG model data and the virtual camera data and a light condition indicating a second positional relationship between each point and the virtual light data.

19. The apparatus according to claim 11, wherein when the CG data includes a plurality of camera data items and corresponds to a vertex, the calculation unit generates virtual CG model data by emphasizing, in accordance with a model change emphasis rate for a plurality of viewpoints, a vector indicating a difference in position coordinates between one of the camera data items and another camera data item adjacent to the one camera data item, the model change emphasis rate being the emphasis parameter, and the calculation unit calculates, as the emphasis texture processing condition, a camera condition indicating a first positional relationship between each point on the virtual CG model data and each of the camera data items, and a light condition indicating a second positional relationship between each point and the light data.

20. The apparatus according to claim 11, wherein when the CG data includes a plurality of camera data items, the processing unit generates virtual color data by emphasizing, in accordance with a color change emphasis rate for a plurality of viewpoints, a vector indicating a difference between color data corresponding to one of the camera data items and a pixel position and color data corresponding to a camera data item adjacent to the one camera data item, the color change emphasis rate being the emphasis parameter, and the processing unit outputs the virtual color data as emphasized texture data.

21. The apparatus according to claim 12, wherein:
the emphasis parameter includes an angle condition emphasis rate, a camera change emphasis rate for a single viewpoints or a plurality of viewpoints, a light change emphasis rate for a single viewpoints or a plurality of viewpoints, a model change emphasis rate for a single viewpoints or a plurality of viewpoints, and a color change emphasis rate for a single viewpoints or a plurality of viewpoints; and
at least one of the calculation unit and the processing unit uses the emphasis parameter to perform emphasis calculation of the processing conditions or the texture data items, and performs at least one of setting arbitrary selected by a user, setting based on characteristics of the CG data, and setting based on specification of the presentation unit.

22. A texture processing method comprising:
acquiring, in a CG data acquisition unit, calculator graphics (CG) data including CG model data, camera data, light data texture data items, and a preset emphasis parameter for texture mapping processing, the CG model data, the camera data and the light data composing data for rendering a CG image, the texture data items being acquired or produced under different conditions;
calculating, in a calculation unit, an emphasis texture processing condition corresponding to the preset emphasis parameter, the emphasis texture processing condition being used to perform texture mapping processing on a CG model using the CG data;
extracting, in an extraction unit, a particular texture data item from the acquired texture data items in accordance with the texture processing condition; and
performing, in a processing unit, emphasis processing on the particular texture data item in accordance with the preset emphasis parameter to obtain a emphasized texture data item.

23. A texture processing method comprising:
acquiring, in a CG data acquisition unit, calculator graphics (CG) data including CG model data, camera data, light data, and texture data items for texture mapping processing, the CG model data, the camera data and the light data composing data for rendering a CG image, the texture data items being acquired or produced under different conditions;
acquiring, in a parameter acquisition unit, an emphasis parameter used for texture mapping processing;
calculating, in a calculation unit, an emphasis texture processing condition corresponding to the emphasis parameter, the emphasis texture processing condition being used to perform texture mapping processing on a CG model using the CG data;
extracting, in an extraction unit, a particular texture data item from the acquired texture data items in accordance with the texture processing condition; and
performing, in a processing unit, emphasis processing on the particular texture data item in accordance with the emphasis parameter to obtain a emphasized texture data item.

* * * * *